US011374797B2

(12) United States Patent
Doostnejad et al.

(10) Patent No.: US 11,374,797 B2
(45) Date of Patent: Jun. 28, 2022

(54) ENHANCED CHANNEL SOUNDING

(71) Applicant: Intel Corporation, Santa Clara, CA (US)

(72) Inventors: Roya Doostnejad, Los Altos, CA (US); Juan Fang, Portland, OR (US); Feng Jiang, Santa Clara, CA (US); Laurent Cariou, Portland, OR (US); Dave Cavalcanti, Portland, OR (US); Xiaogang Chen, San Ramon, CA (US); Timothy F. Cox, Palo Alto, CA (US); Jeffrey Foerster, Portland, OR (US); Po-Kai Huang, San Jose, CA (US); Qinghua Li, San Ramon, CA (US); Javier Perez-Ramirez, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 16/794,911

(22) Filed: Feb. 19, 2020

(65) Prior Publication Data

US 2020/0213160 A1 Jul. 2, 2020

Related U.S. Application Data

(60) Provisional application No. 62/880,847, filed on Jul. 31, 2019, provisional application No. 62/835,360, filed on Apr. 17, 2019, provisional application No. 62/807,464, filed on Feb. 19, 2019.

(51) Int. Cl.
*H04L 25/02* (2006.01)
*H04W 84/12* (2009.01)

(52) U.S. Cl.
CPC ...... *H04L 25/0224* (2013.01); *H04L 25/0218* (2013.01); *H04W 84/12* (2013.01)

(58) Field of Classification Search
CPC . H04L 25/0224; H04L 25/0218; H04W 84/12
See application file for complete search history.

(56) References Cited

U.S. PATENT DOCUMENTS

2018/0205442 A1* 7/2018 Oteri ............... H04B 7/0417
2018/0337713 A1* 11/2018 Elsherif ........... H04B 7/0417

* cited by examiner

*Primary Examiner* — Natasha W Cosme
(74) *Attorney, Agent, or Firm* — Eversheds Sutherland (US) LLP

(57) ABSTRACT

This disclosure describes systems, methods, and devices related to multi-user uplink channel sounding. A device may determine a channel sounding sequence with one or more access points (APs), wherein the channel sounding sequence comprises a null data packet announcement (NDPA) communicated with at least one of the one or more APs. The device may determine a first group of station devices (STAs) associated with a first basic service set (BSS). The device may cause to send a trigger frame to the first group of STAs to solicit an uplink NDP from each STA of the first group of STAs. The device may identify a first uplink NDP received from a first STA of the first group of STAs. The device may identify a second uplink NDP received from a second STA of a second group of STAs.

20 Claims, 31 Drawing Sheets

|  | | | | | | | | | | |
|---|---|---|---|---|---|---|---|---|---|---|
| STA1 | Set 1 | 0 | 0 | 0 | Set 1 | 0 | 0 | 0 | Set 1 | ⋮ |
| STA2 | 0 | Set 2 | 0 | 0 | 0 | Set 2 | 0 | 0 | 0 | ⋮ |
| STA3 | 0 | 0 | Set 3 | 0 | 0 | 0 | Set 3 | 0 | 0 | ⋮ |
| STA4 | 0 | 0 | 0 | Set 4 | 0 | 0 | 0 | Set 4 | 0 | ⋮ |

Subcarriers →

ENHANCED CHANNEL SOUNDING

CROSS-REFERENCE TO RELATED APPLICATION(S)

This application claims the benefit of U.S. Provisional Application No. 62/807,464, filed Feb. 19, 2019, U.S. Provisional Application No. 62/835,360, filed Apr. 17, 2019, and U.S. Provisional Application No. 62/880,847, filed Jul. 31, 2019, all disclosures of which are incorporated herein by reference as if set forth in full.

TECHNICAL FIELD

This disclosure generally relates to systems and methods for wireless communications and, more particularly, to enhanced channel sounding.

BACKGROUND

Wireless communications have evolved and increased data rates. In a high-density deployment environment, overall system efficiency can become as important as high data rates. For example, in high-density scenarios, many devices competing for wireless media may have specific data rate requirements.

BRIEF DESCRIPTION OF THE DRAWINGS

FIG. 16 depicts an illustrative schematic diagram for frequency multiplexing of training fields from multiple STAs in uplink, in accordance with one or more example embodiments of the present disclosure.

DETAILED DESCRIPTION

Figure 1:
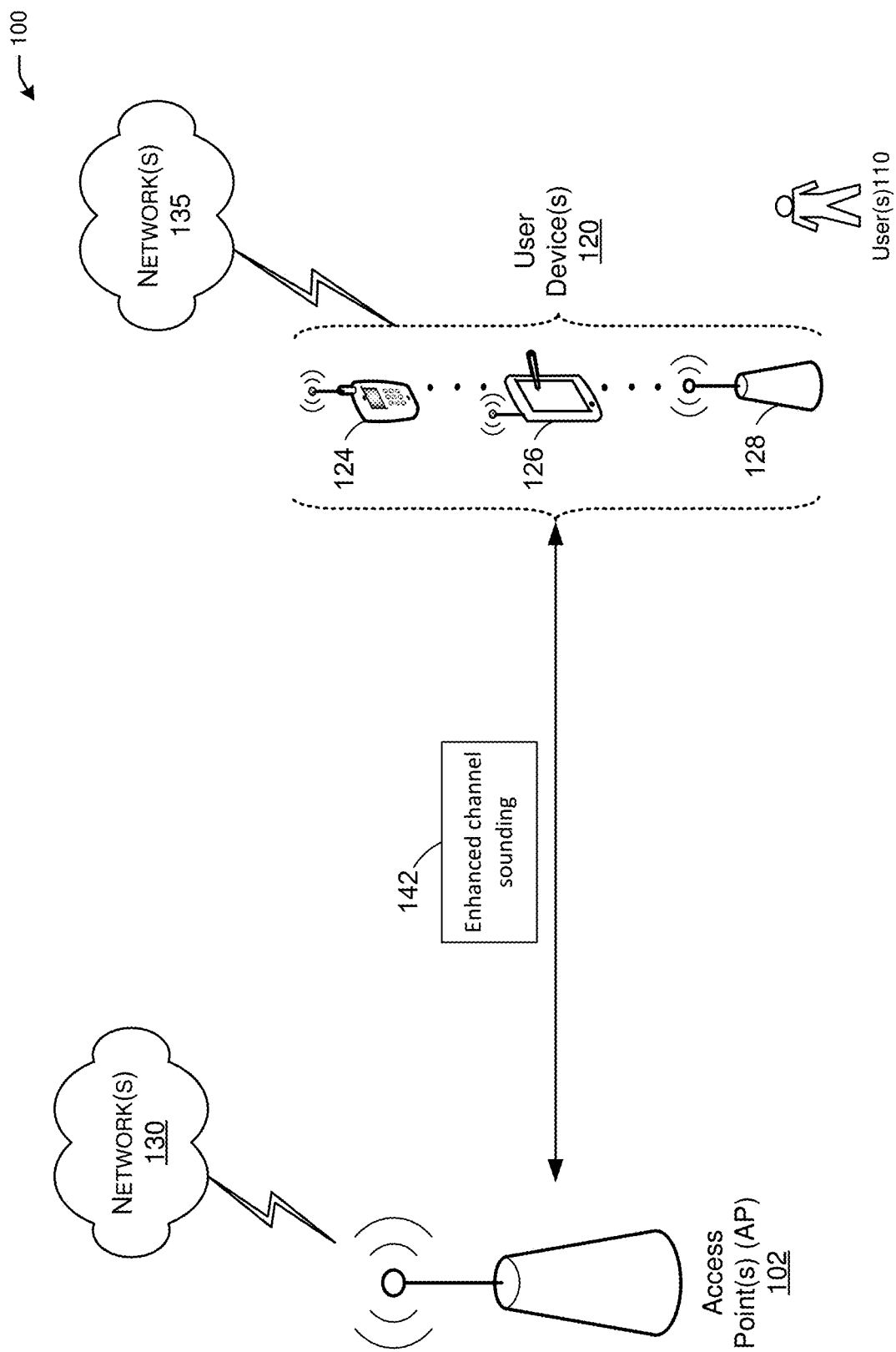
FIG. 1 is a network diagram illustrating an example network environment for enhanced channel sounding, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

Recently the development for the next generation Wi-Fi extreme high throughput (EHT) was initiated. To improve efficiency and throughput, a potential new feature of EHT is the multi-AP cooperation, in which adjacent APs can implement joint beamforming or cooperated beamforming for data transmission to STA or data reception from STA. Either joint beamforming or cooperative beamforming requires the APs or STAs to have detailed information of the downlink or uplink channel state information between APs and STAs. One way for downlink channel sounding is to use explicit channel state information (CSI) feedback, and in the legacy systems explicit CSI feedback, after the STA gets the channel estimation based on the LTF field, the STA uses singular value decomposition (SVD) to decompose the channel matrix and feed the compressed singular vector which corresponds to the first N largest singular values to the AP, and the AP can de-compress these singular vectors and use these singular vectors to design beamforming vector for the downlink data transmission between AP and STA, and the beamforming vector should be designed to maximize the SNR at the STA side. For the cooperated beamforming, when the AP designs the downlink beamforming vector for the STA in its own BSS, in addition, to improve the SNR at STA side, the AP should also consider the interference to the adjacent BSS, and the interference to the adjacent BSS need to be minimized, such that the overall throughput for all the BSS will be increased.

To improve efficiency and throughput, a potential new feature of EHT is the 16 spatial streams and multi-AP cooperation, which requires the AP and STA to exchange a large amount of channel state information for beamforming. To reduce the overhead of explicit channel sounding, one possible way is to implement implicit channel sounding, in which the AP can estimate the downlink channel between AP and STA using an uplink null data packet (NDP) received from the STA.

In one or more sounding sequences, the scheduling or resource allocation for each STA group depends on the STAs status (e.g., being ready or not ready to receive/send data) and the STA's received signal strength indicator (RSSI) at the AP side, and to mitigate the inter-STA interference at a receiver device of AP, the AP should allocate the STAs with similar RSSI in the same group. There are no related discussions for adding a polling phase to the implicit channel sounding.

Currently, explicit sounding is employed to enable multiuser (MU) beamforming (BF) in the downlink (DL). This requires the stations (STAs) to measure the channel in DL and then feedback a quantized estimation of the channel to an AP. This feedback will cause significant overhead and also as a result of quantization and a delay in sending channel measurements, the BF weights may not be accurate or maybe obsolete especially in dynamic radiofrequency (RF) environments. These problems are more pronounced for a higher number of antennas and/or multi-AP scenarios.

Implicit sounding requires the STAs to transmit an NDP in the uplink direction (from STA to AP). There is a need to minimize the network overhead and channel aging impact such that the NDP transmission from multiple STAs should be multiplexed efficiently.

Recently, EHT and low latency requirements have also been introduced as a goal for the next major 802.11 release. 320 MHz bandwidth, 16 spatial streams, and MIMO protocol enhancements are introduced as candidate features in EHT.

With the increasing number of antennas or spatial streams and channel bandwidth, the overhead due to the channel statement information feedback will increase dramatically. Currently, frequency domain compressed explicit feedback method is used to reduce the overhead. However, the overhead after compression is still very high. Time domain compressed explicit feedback approach was proposed, however, all the paths within the cyclic prefix are requested to be feed back to the transmitter device.

Example embodiments of the present disclosure relate to systems, methods, and devices for channel sounding and data transmission for AP cooperation beamforming.

In one embodiment, an enhanced channel sounding system may facilitate a channel sounding and explicit CSI feedback method for the multi-AP cooperate beamforming design.

In one or more embodiments, an enhanced channel sounding system may define a channel sounding sequence between adjacent BSS and define a frame format for the multi-AP explicit channel state information (CSI) report. In the proposed channel sounding and CSI feedback sequence, each AP sequentially transmits the downlink null data packet (NDP) and after the channel sounding, each AP sequentially solicits the CSI feedback from station devices (STAs) that belong to its own basic service set (BSS). Each AP only needs to manage the STAs within its own BSS.

Example embodiments of the present disclosure relate to systems, methods, and devices for polling for implicit channel state information feedback in EHT.

In one embodiment, a system may add a polling phase to the implicit channel sounding, and in the polling phase, the AP can send a trigger frame to STAs to solicit poll responses and if an STA is ready for implicit channel sounding, the STA will send a poll response to AP. Based on the poll response, the AP can determine the STA's status and the STA's received signal strength indicator (RSSI) level. The proposed polling phase enables the AP to check STA's status and RSSI, such that AP can better schedule the STAs into different sounding groups.

Example embodiments of the present disclosure relate to systems, methods, and devices for multi-user uplink channel sounding.

In one or more embodiments, a system may facilitate different schemes for multiplexing the training signals of multiuser in UL to enable implicit channel sounding where AP can directly measure the channels in UL and calculate BF weights.

In one or more embodiments, a system may facilitate different schemes for multiplexing training signals in uplink to enable implicit channel sounding in 802.11ax. The STAs are directed to be multiplexed in spatial domain on different spatial streams, or in frequency in different tones. Alternatively, STAs may be directed to transmit NDP sequentially in time. A combination of these schemes can be also applied to multiplex NDP from different STAs depending on their relative path loss and distribution.

Some of the advantages may include lower network overhead, less latency in obtaining BF weights which improves the accuracy of BF weights, and/or no quantization/compression impact as BF weights are calculated directly from channel.

Example embodiments of the present disclosure relate to systems, methods, and devices for reduction for channel state information feedback with time domain compression approach.

In one embodiment, a system may facilitate an enhanced time domain compressed feedback approach to reduce the overhead due to the channel sounding feedback for downlink (DL)/uplink (UL) multi-user (MU) multiple-input multiple-output (MIMO) or multiple AP joint transmission. That is, a system may reduce the overhead of the channel sounding feedback for DL/UL MU MIMO, multiple AP joint processing, coordinated beamforming and coordinated orthogonal frequency-division multiple access (OFDMA) transmission.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of an enhanced channel sounding system, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or maybe stationary devices.

Figure 26:
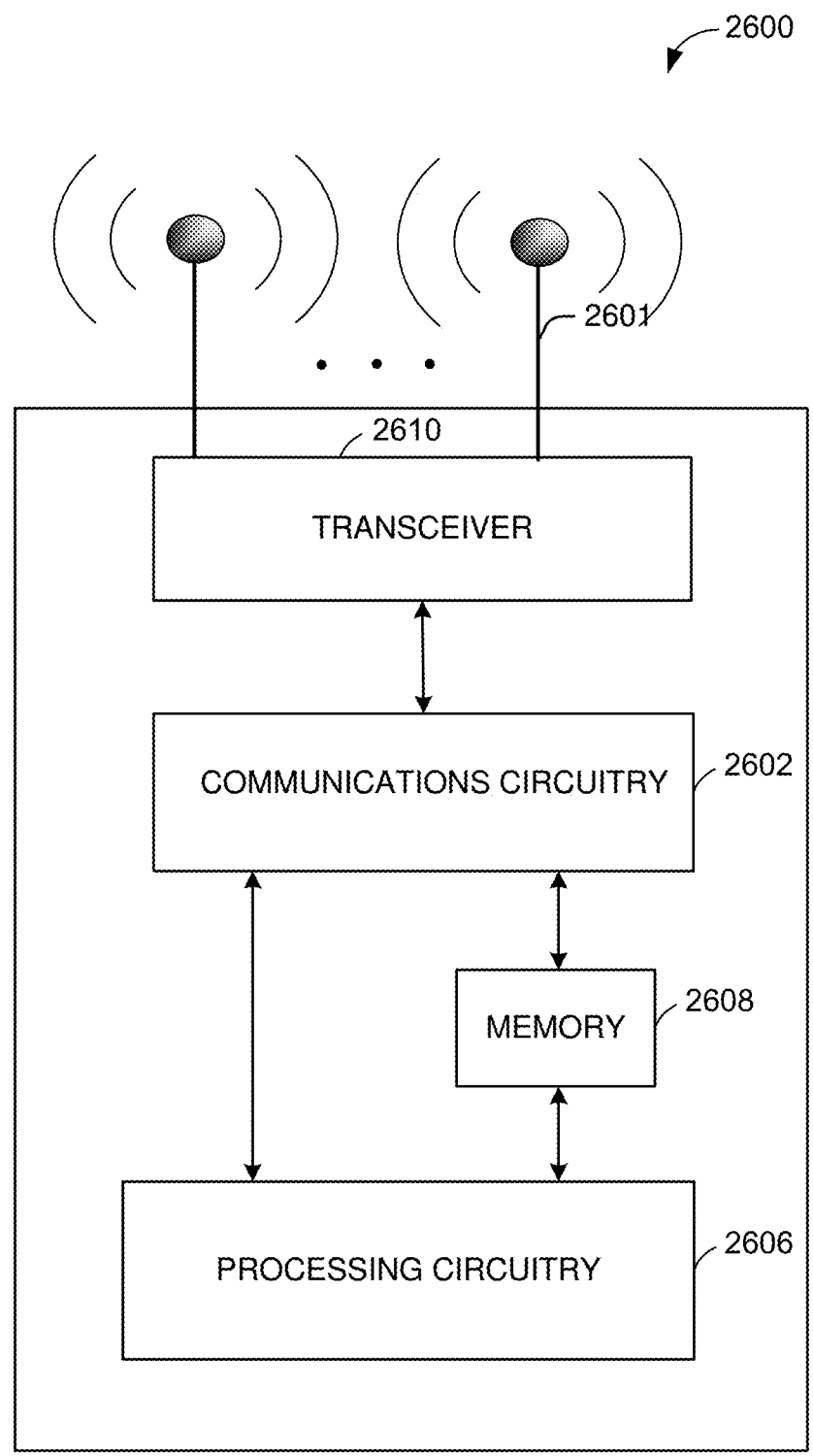
FIG. 26 illustrates a functional diagram of an exemplary communication station that may be suitable for use as a user device, in accordance with one or more example embodiments of the present disclosure.
Figure 27:
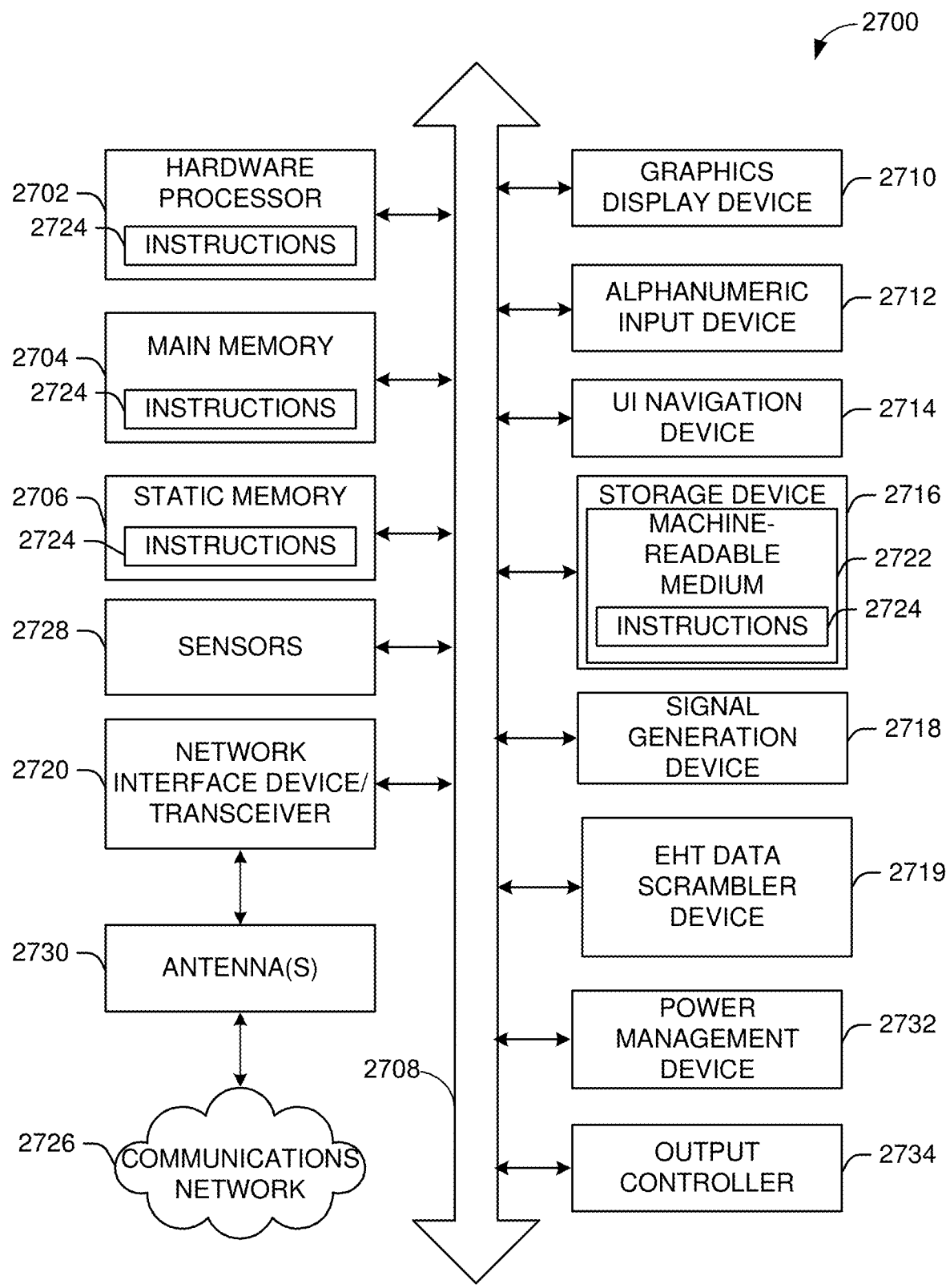
FIG. 27 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 26 and/or the example machine/system of FIG. 27.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber-coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHz channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate an enhanced channel sounding 142 with one or more user devices 120.

It is understood that the above descriptions are for purposes of illustration and are not meant to be limiting.

Figure 2:
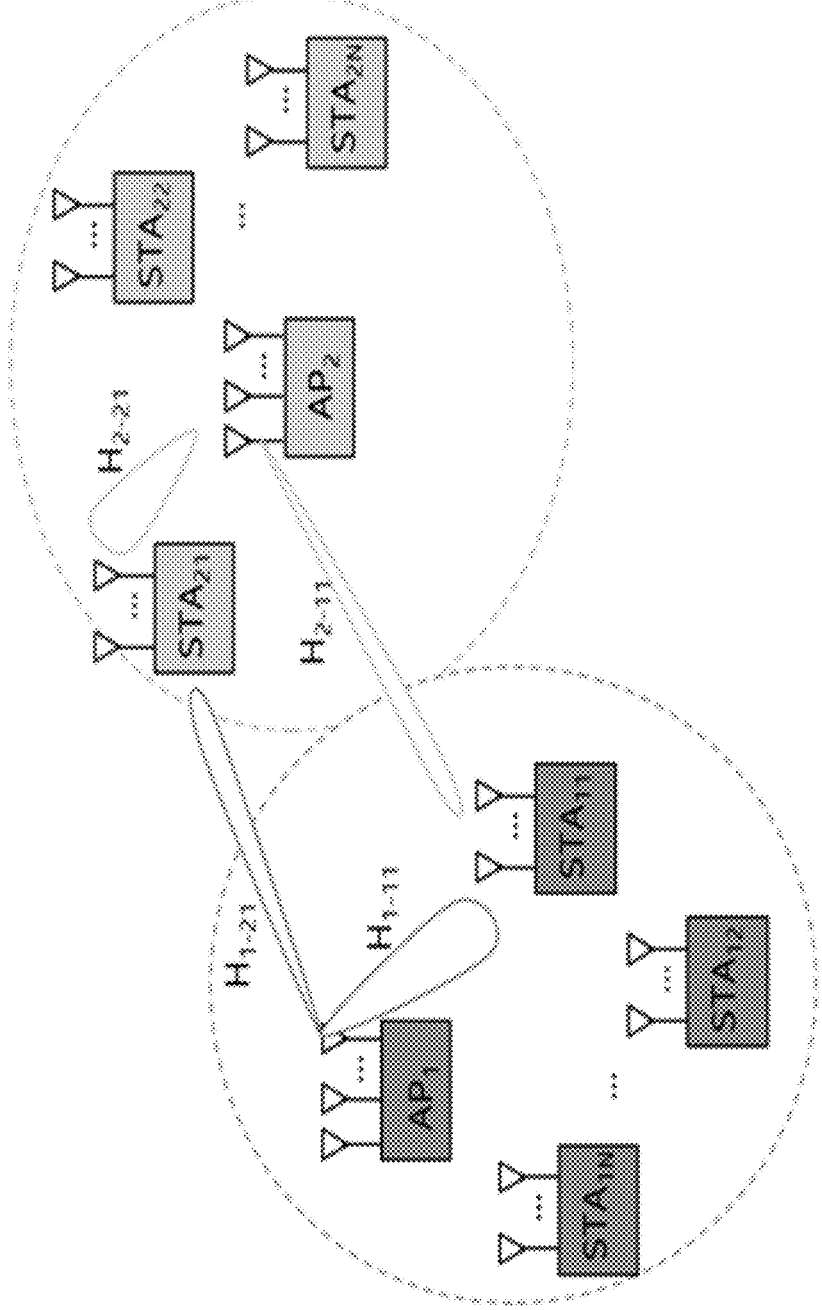
FIG. 2 depicts an illustrative schematic diagram for cooperated beamforming, in accordance with one or more example embodiments of the present disclosure.

FIG. 2 depicts an illustrative schematic diagram for cooperated beamforming, in accordance with one or more example embodiments of the present disclosure.

An example of cooperated beamforming is shown in FIG. 2, and when AP1 transmits to STA11, AP1 minimizes the interference to STA21, and when AP2 transmits to STA21, AP2 minimizes the interference to STA11. To maximize the data transmission, the channel between AP1 and STA11 ($H_{1-11}$) needs to be known at AP1 and the channel between AP2 and STA21 ($H_{2-21}$) needs to be known at AP2. To minimize the inter-BSS interference, the channel between AP1 and STA21 ($H_{1-21}$) needs to be known at AP1 and the channel between AP2 and STA11 ($H_{2-11}$) needs to be known at AP2.

Figure 3:
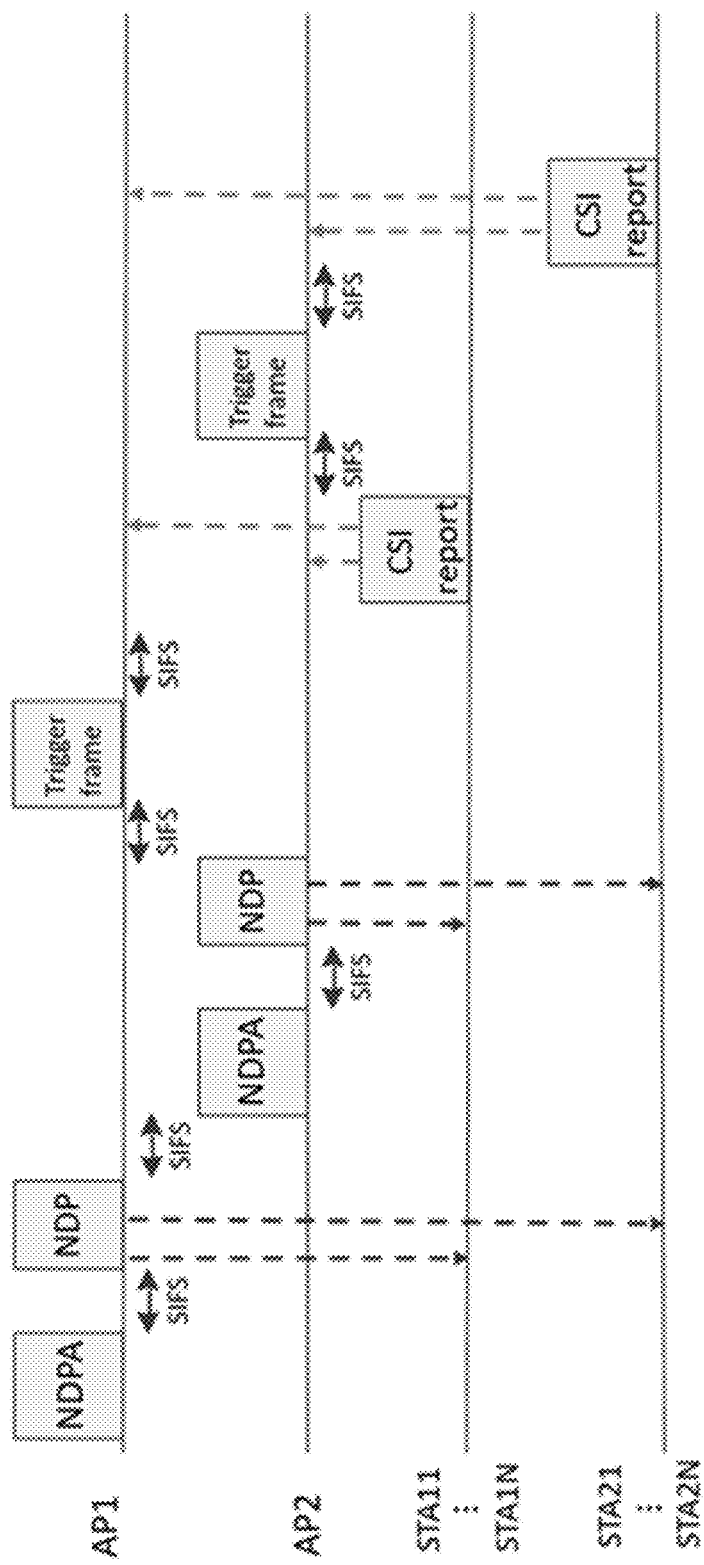
FIG. 3 depicts an illustrative schematic diagram for channel sounding sequence and CSI report, in accordance with one or more example embodiments of the present disclosure.

FIG. 3 depicts an illustrative schematic diagram for channel sounding sequence and CSI report, in accordance with one or more example embodiments of the present disclosure.

The AP1 may send a downlink NDPA frame. This NDPA may be defined as a new frame type that initiates the channel sounding for multi-APs in a coordinated group of APs. This NDPA frame may include information that may assist the group of APs when performing channel sounding. That is the NDPA frame may include the information associated with the APs that will join/perform the multi-AP channel sounding, and this NDPA can also define the order of the AP and include the association identification (AID) information associated with the STAs which are requested to process the following NDP frames. After the STAs in AP1's BSS and the STAs in AP2's BSS receive the NDPA sent by AP1, the STAs will decode the NDPA frame and extract the parameter information for the NDP frame that will follow. After short inter-frame space (SIFS) time of sending the NDPA, the AP1 sends the downlink (DL) NDP, and based on the DL NDP, the STAs in AP1's BSS and the STAs in AP2's BSS can obtain a channel estimation for the downlink channel between the AP1 and the STA. After SIFS time of receiving the AP1's DL NDP, AP2 sends its NDPA frame, and the STAs in AP2's BSS and STAs in AP1's BSS may receive this NDPA frame, and after SIFS time of sending NDPA, the AP2 will send the DL NDP and based on this DL NDP, the STAs in AP1's BSS and the STAs in AP2's BSS can get a channel estimation of the DL channel between the AP2 and the STA.

In one or more embodiments, after SIFS time of receiving AP2's NDP, AP1 sends a trigger frame to STAs in AP1'S BSS to solicit the channel state information (CSI) report. This trigger frame is a new type of trigger frame for the CSI report of multi-AP channel sounding. This trigger frame can use the STAs' AID to identify the AP1's STAs that are requested to send a CSI report. AP2 also decode this trigger frame to learn the AP1's STAs' information. After SIFS time of receiving the trigger frame, the STAs in AP1's BSS response with a CSI report frame. In the CSI report frame the STAs, report the CSI for AP1' NDP and AP2' NDP, and the CSI can be identified by the AP1 and AP2's BSSID. Both AP1 and AP2 will listen to the CSI report frame from STAs in AP1's BSS. After decoding this CSI report, AP1 can obtain the CSI for the channel between AP1 and STAs in AP1's BSS and AP2 can obtain the CSI for the channel between AP2 and STAs in AP1's BSS.

In one or more embodiments, after SIFS time of receiving the AP1's STAs' CSI report, the AP2 sends a trigger frame to solicit the CSI report from AP2's STAs, and this trigger frame can use the STAs' AID to identify the AP2's STAs that are requested to send CSI report. AP1 also decode this trigger frame to learn the AP2's STAs' information. After receiving this AP2's trigger frame, STAs in AP2's BSS response with a CSI report frame, which includes the CSI for AP1'NDP and AP2' NDP, and the CSI can be identified by the AP1 and AP2's BSSID. Both of AP1 and AP2 will listen to the CSI report frame from STAs in AP2's BSS. After decoding this CSI report, AP1 can obtain the CSI for the channel between AP1 and STAs in AP2's BSS and AP2 can obtain the CSI for the channel between AP2 and STAs in AP2's BSS. Based on this CSI information, AP1 and AP2 can design the beamforming matrix for the STAs in AP1's and AP2's BSS.

In one or more embodiments, for the computation of the CSI report at the STA side, one possible method is to utilize the compressed beamforming feedback in 11ax, and after the STA gets the channel matrix, the STA first implements SVD of the channel matrix and then subtract the signal subspace of the V matrix and compute the compressed beamforming vectors. Based on the signal subspace of the channel matrix between the AP and the STAs in adjacent BSS, the AP can compute the null space for the STAs in the adjacent BSS.

Figure 4:
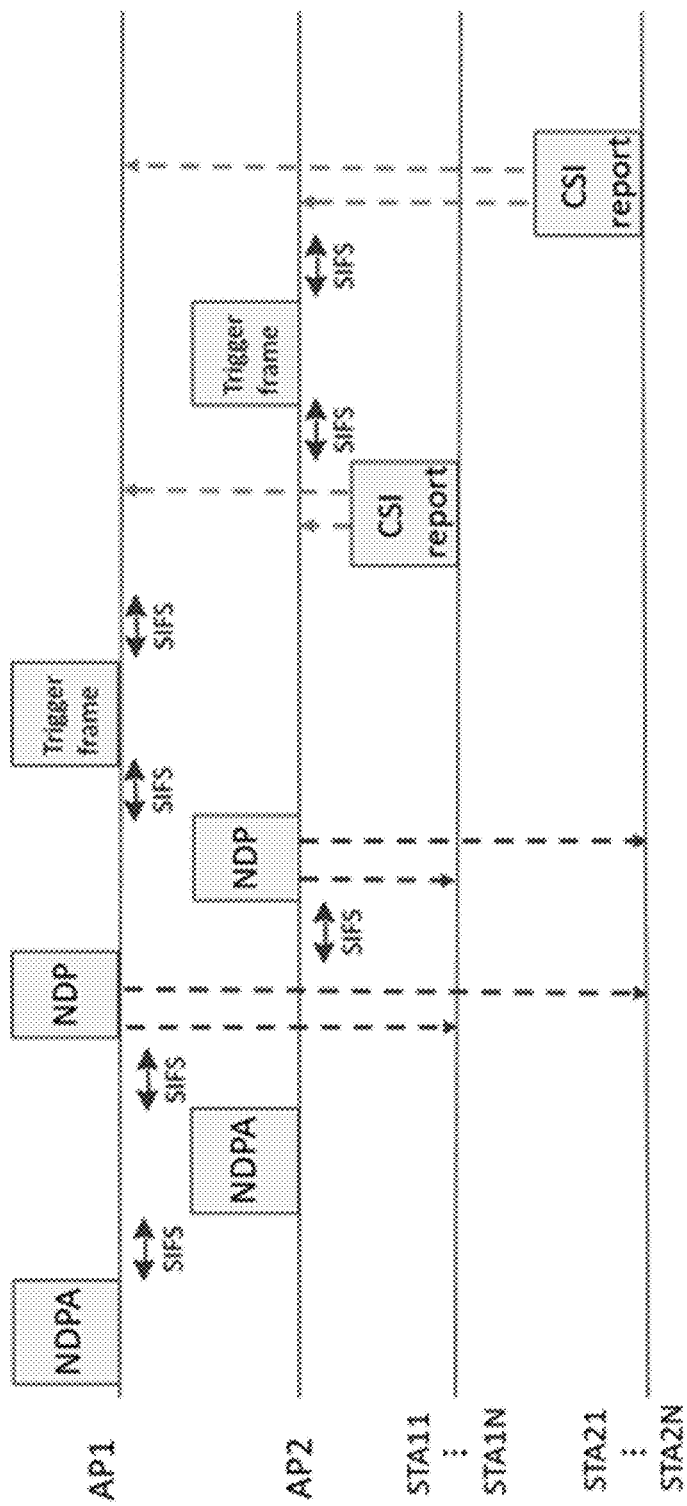
FIG. 4 depicts an illustrative schematic diagram for multi-AP sounding sequence, in accordance with one or more example embodiments of the present disclosure.

FIG. 4 depicts an illustrative schematic diagram for multi-AP sounding sequence, in accordance with one or more example embodiments of the present disclosure.

Another example of a multi-AP sounding sequence is shown in FIG. 4. In this example, AP1 and AP2 first send the NDPA frame to announce the multi-AP sounding and following the NDPA frame, AP1 and AP2 send an NDP and a trigger frame respectively in order to induce CSI reporting from each group of STAs in their respective BSS.

Figure 5:
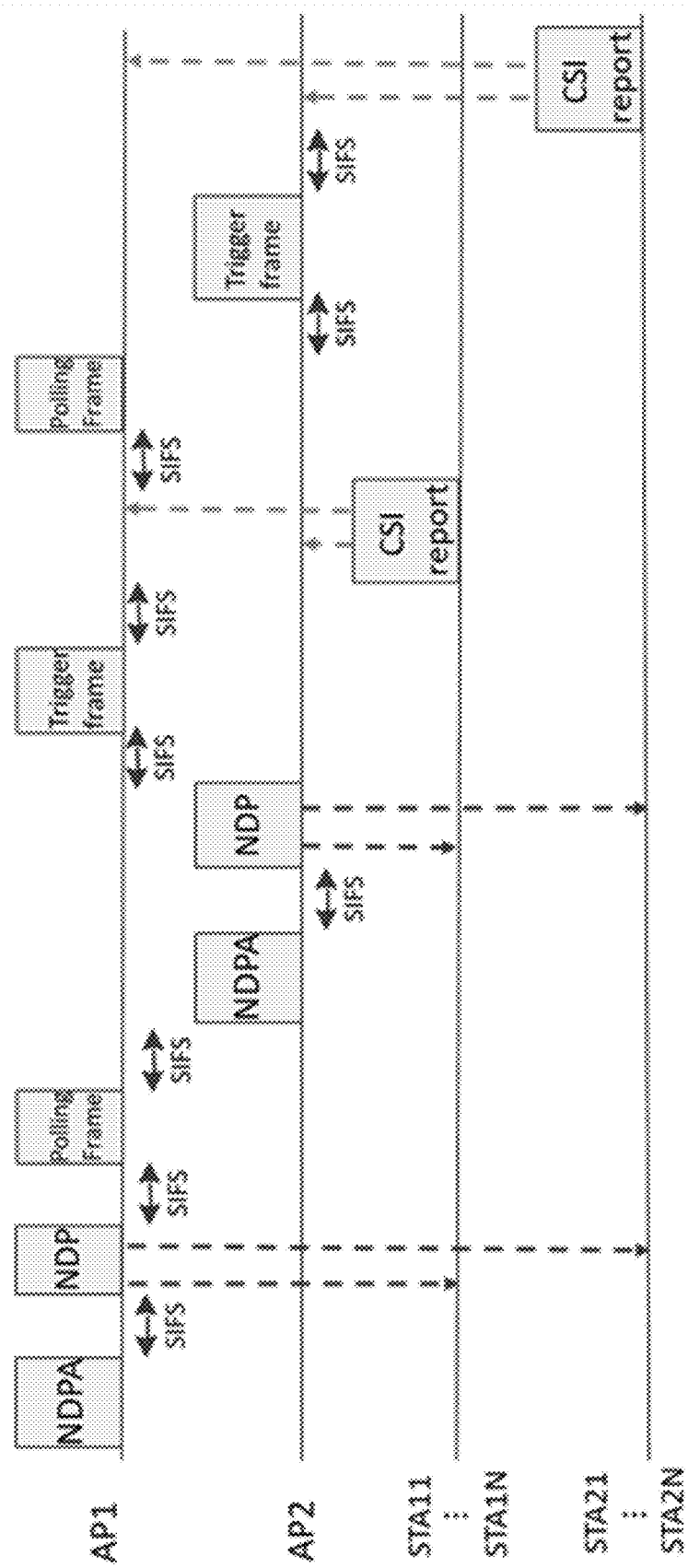
FIG. 5 depicts an illustrative schematic diagram for enhanced channel sounding, in accordance with one or more example embodiments of the present disclosure.

FIG. 5 depicts an illustrative schematic diagram for enhanced channel sounding, in accordance with one or more example embodiments of the present disclosure.

In one or more embodiments, to avoid the sequence in FIG. 3, it may be possible to add an additional polling frame or trigger frame to trigger the AP2 to transmit NDPA+NDP or trigger frame for CSI. This polling frame can reduce the possibility that a third party STA can detect an idle medium. An example is given in FIG. 5. Please note that the polling frame can be replaced with a trigger frame.

In one or more embodiments, the polling frame/trigger frame can have a type information, and one type for the NDPA+NDP and one type for trigger frame soliciting CSI. Also, the polling frame includes the AP2's BSSID information for identifying the AP that is requested for transmission. If AP1 does not detect the NDPA frame or trigger frame after SIFS time of sending out the polling frame, the AP1 can send another polling frame to poll the other APs, or directly sends out the trigger frame to solicit AP1's STAs' CSI report. In a managed network, this polling frame may not be necessary and for this case the sequence in FIG. 3 can be used. In FIG. 4, the polling frame can be added before the second NDPA frame and the second NDP frame and the second trigger frame to avoid the break of the sequence.

Figure 6:
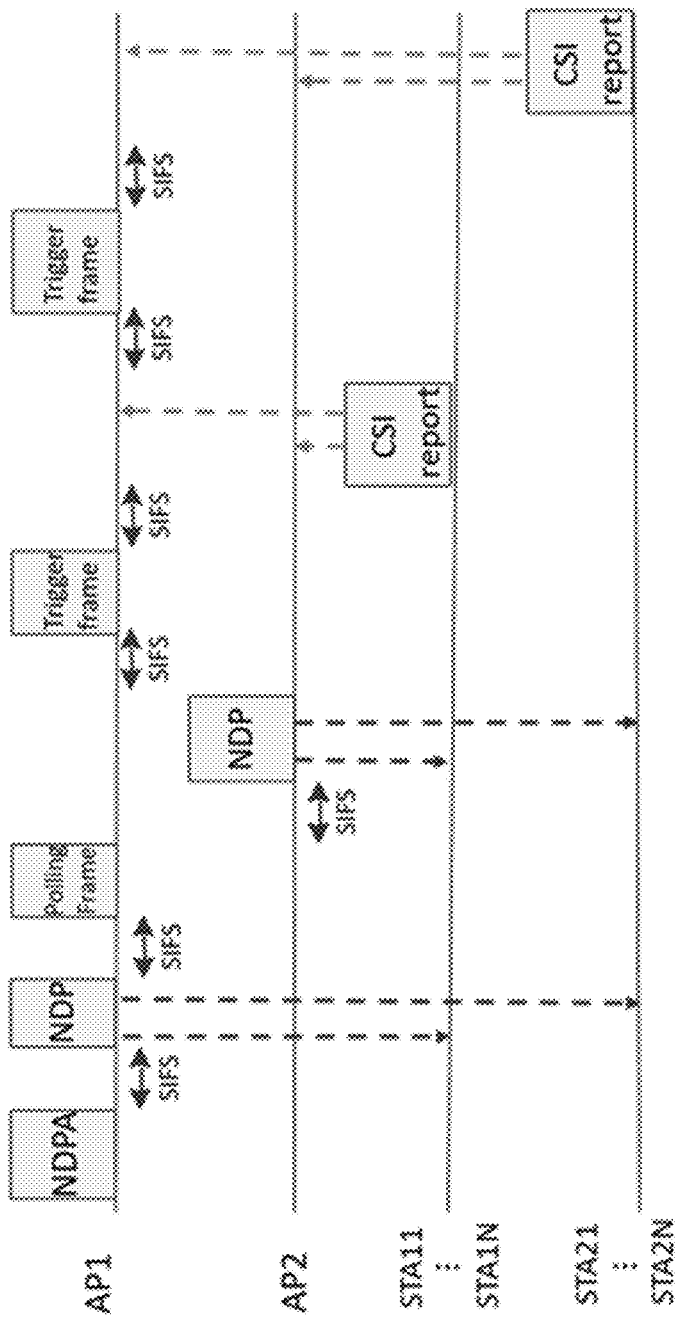
FIG. 6 depicts an illustrative schematic diagram for enhanced channel sounding, in accordance with one or more example embodiments of the present disclosure.

FIG. 6 depicts an illustrative schematic diagram for enhanced channel sounding, in accordance with one or more example embodiments of the present disclosure.

Another sounding sequence is given in FIG. 6, and in this example the NDPA from AP2 is skipped for better efficiency and the AP1 use polling frame to trigger AP2's NDP. Also for the CSI report, AP1 uses a trigger frame to solicits CSI from both AP1's and AP2's STAs. To further improve efficiency, the two trigger frames can be combined into one trigger frame.

In one or more embodiments, after the channel sounding and CSI feedback, AP1 and AP2 can use the CSI information to design the beamforming vector for data transmission. To achieve the interference nulling to the adjacent OBSS, the AP needs to know which STAs are having data transmission in the adjacent OBSS. Also, to maximally reduce inter-BSS interference, the data transmission in adjacent BSS shall be synchronized.

Figure 7:
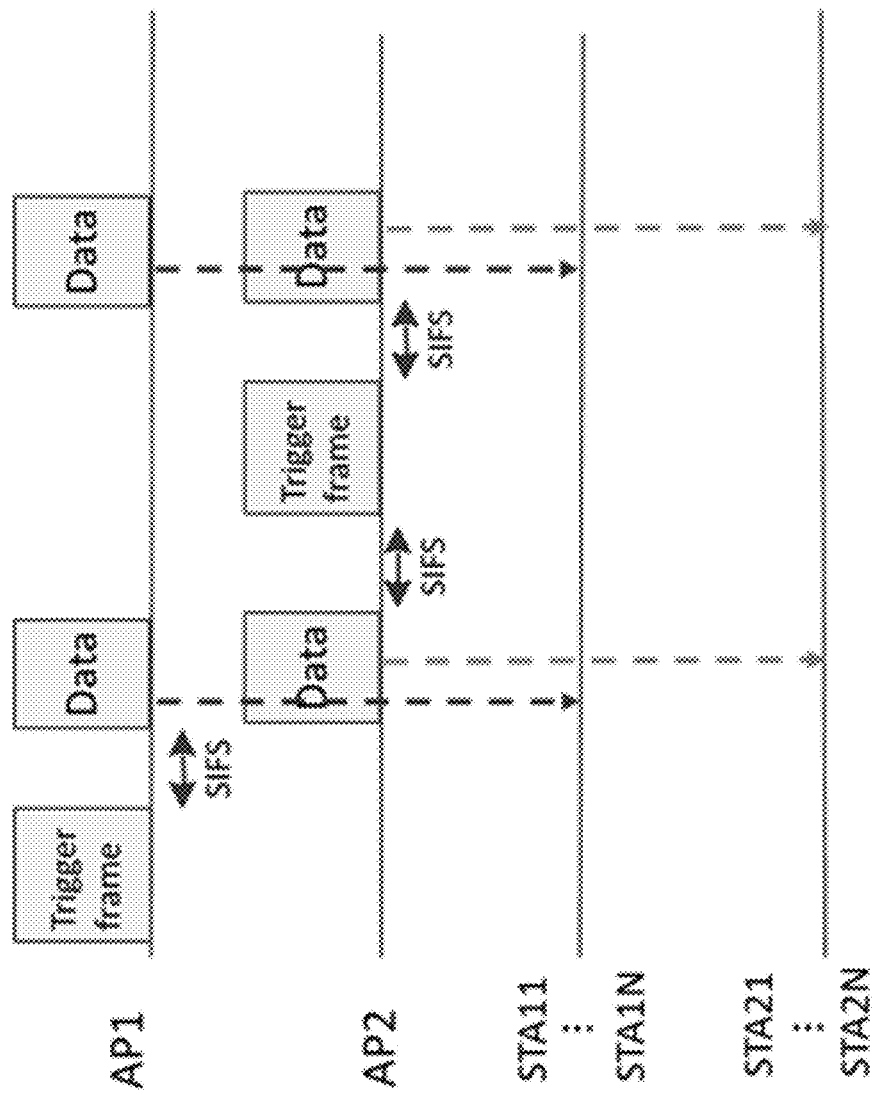
FIG. 7 depicts an illustrative schematic diagram for cooperated data transmission, in accordance with one or more example embodiments of the present disclosure.

FIG. 7 depicts an illustrative schematic diagram for cooperated data transmission, in accordance with one or more example embodiments of the present disclosure.

The AP1 first sends a trigger frame to initiate the cooperated data transmission, and in the trigger frame, the AP1 indicates AP1 will transmit data to which STA and on which resource unit (RU). After SIFS time of sending the trigger frame, the AP1 transmits the DL date frame. The AP2 can listen to the AP1's trigger frame, and after decoding the AP1's trigger frame, AP2 knows which STAs in AP1's BSS will receive data in the following data transmission, so if AP2 wants to join the cooperated data transmission, the AP2 can design its data transmission beamforming matrix to minimize the interference to AP1's STAs.

Figure 8:
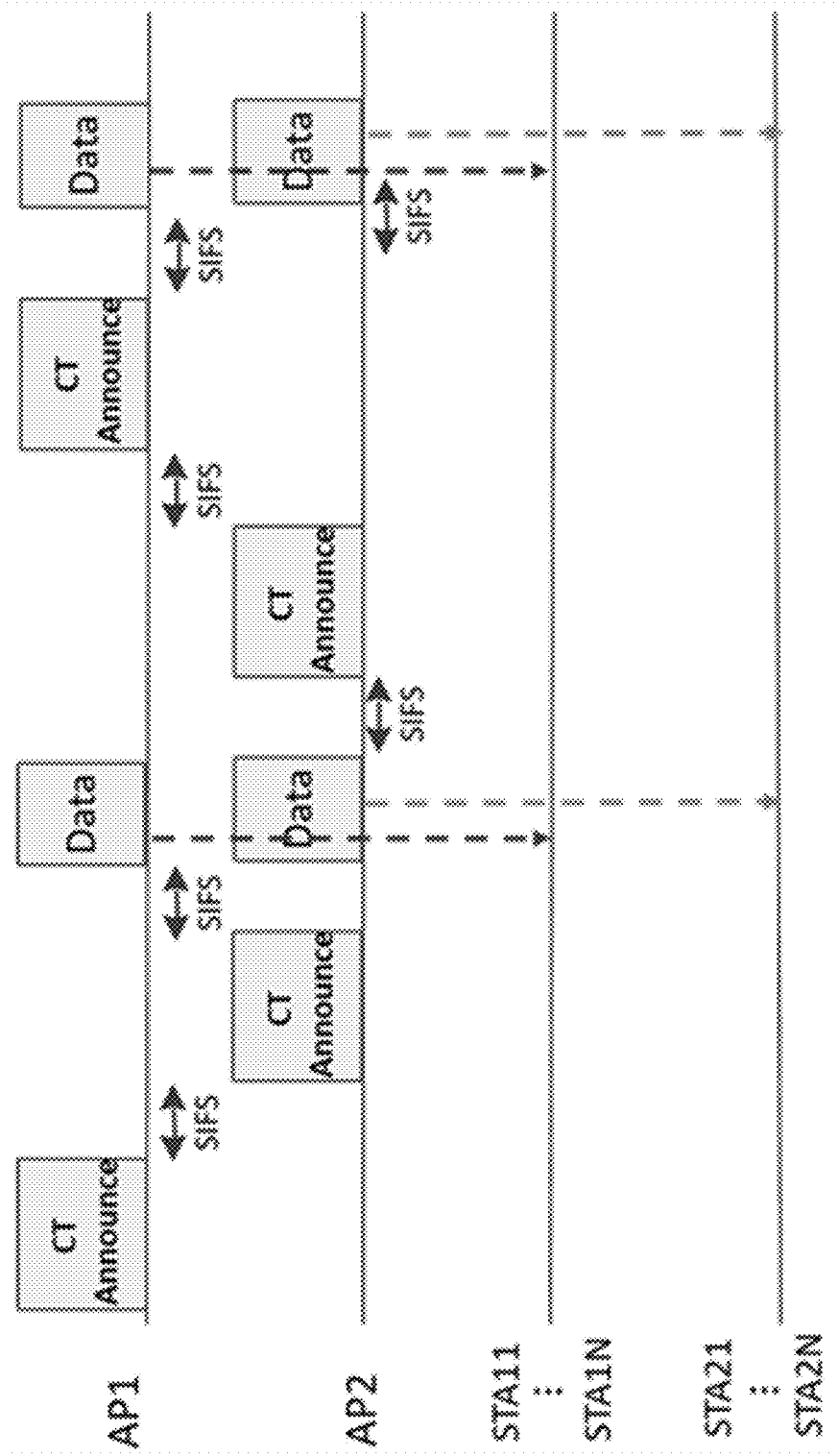
FIG. 8 depicts an illustrative schematic diagram for cooperated data transmission, in accordance with one or more example embodiments of the present disclosure.

FIG. 8 depicts an illustrative schematic diagram for cooperated data transmission, in accordance with one or more example embodiments of the present disclosure.

AP1 first sends a cooperated transmission (CT) announcement frame and in this frame, AP1 includes the scheduling information for the following data transmission, for example, which STA will receive the data packet on which tone or RU. After SIFS time of receiving AP1's CT announcement frame, AP2 sends its CT announcement frame which includes the scheduling information for AP2's data transmission. Based on the scheduling information in CT announcement frame, AP1 and AP2 can design the beamforming matrix to reduce the interference to the receiving STAs in adjacent BSS. Either AP1 or AP2 can initiate the cooperated data transmission by sending the CT announcement frame.

In one or more embodiments, the AP1 and AP2 may need to negotiate a recurring time window for the channel sounding and cooperated data packet transmission.

During the cooperated data transmission, some tones of the data packet can be set to null tones with no data information, and these null tones can help the STA to estimate the interference level from the adjacent BSS and assist the receiver to decode data symbol on the data tones.

In one or more embodiments, the data transmission schemes illustrated in FIGS. 12-15 are independent of the CSI feedback type, and either explicit CSI or implicit CSI can be used.

In all the examples, two APs are used for simplicity of illustration and the proposal can be straightforwardly generalized to more APs scenario. It is understood that the above descriptions are for purposes of illustration and are not meant to be limiting.

Figure 9:
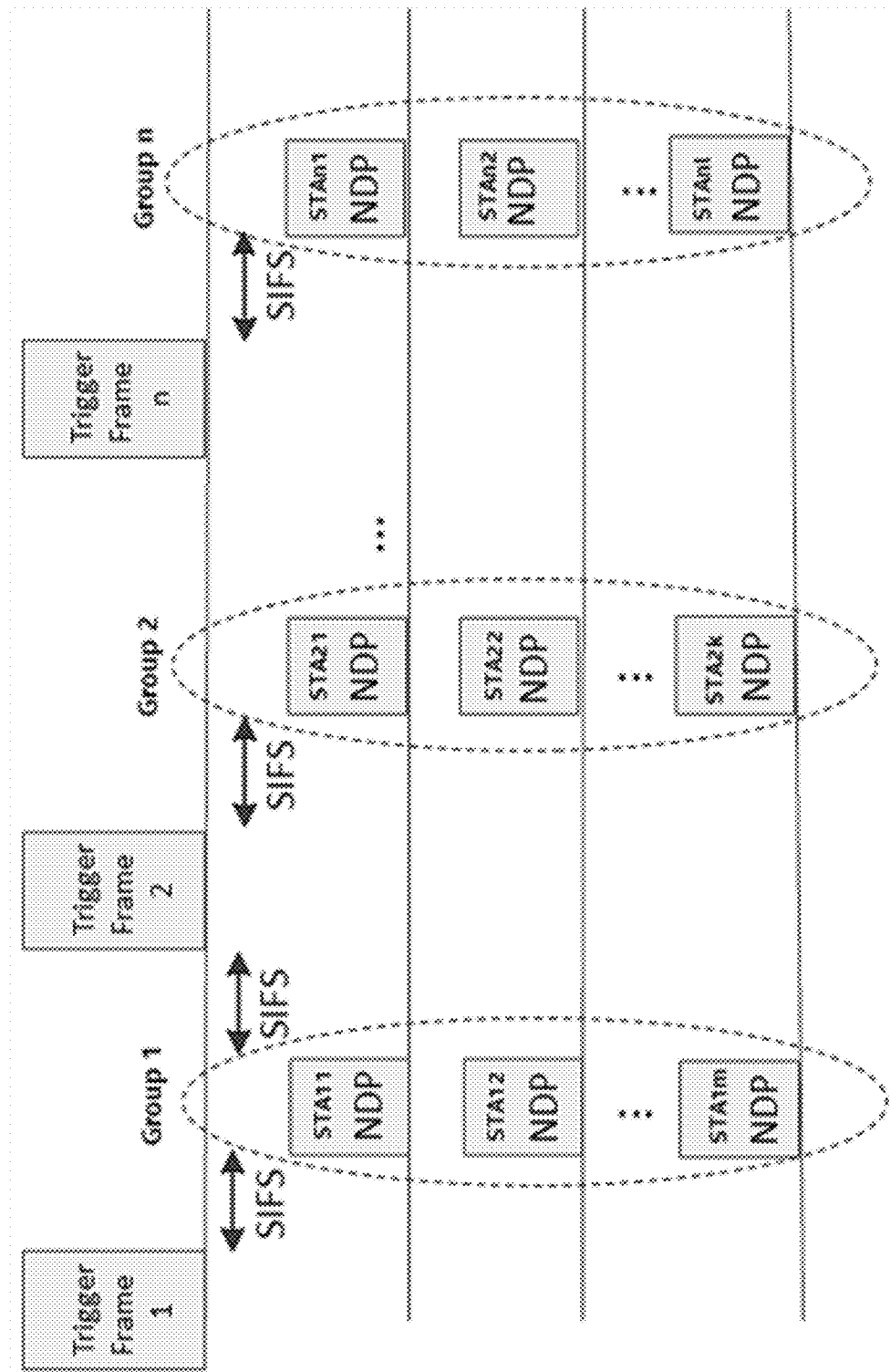
FIGS. 9-11 depict illustrative schematic diagrams for implicit channel state information, in accordance with one or more example embodiments of the present disclosure.
Figure 10:
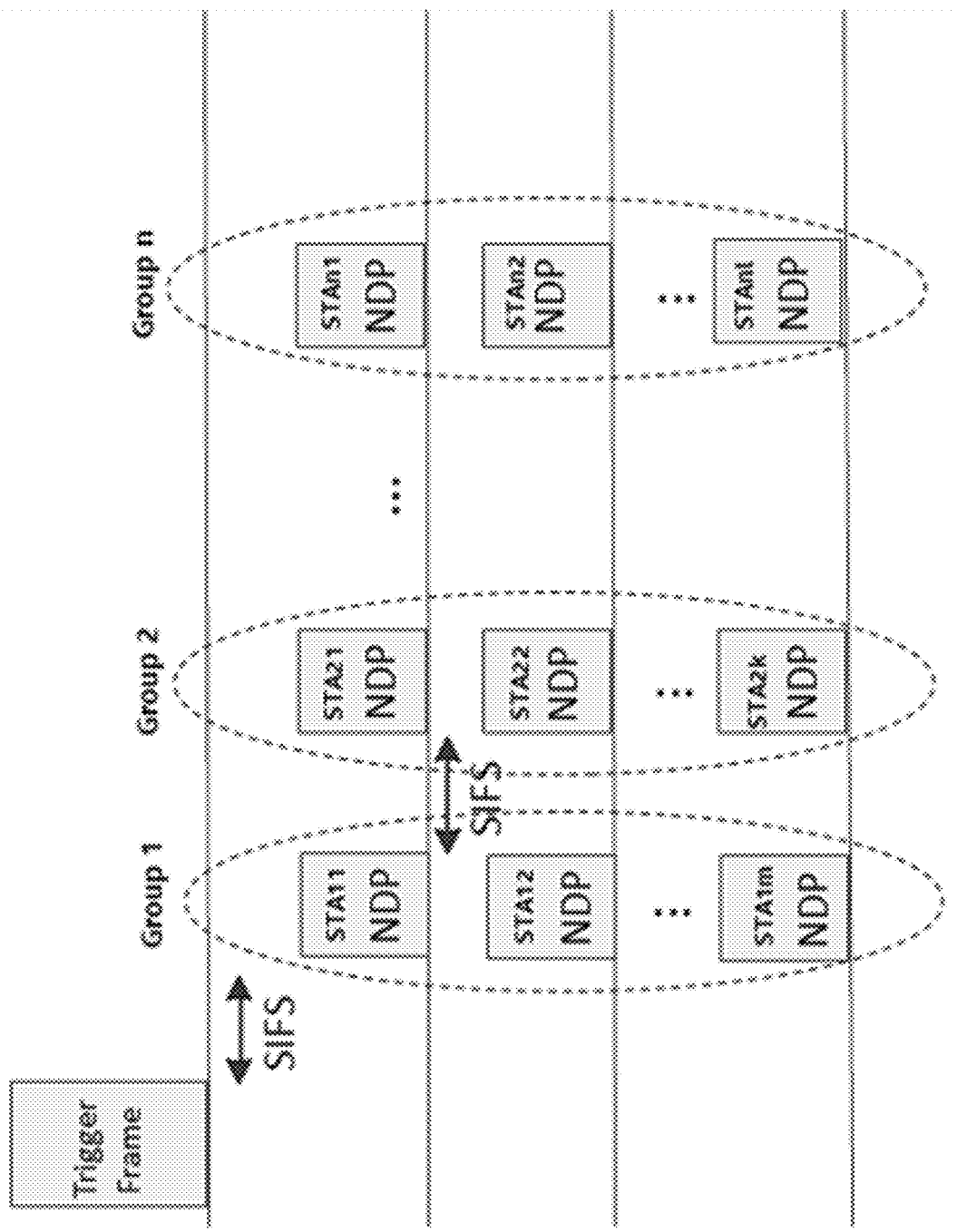
Figure 11:
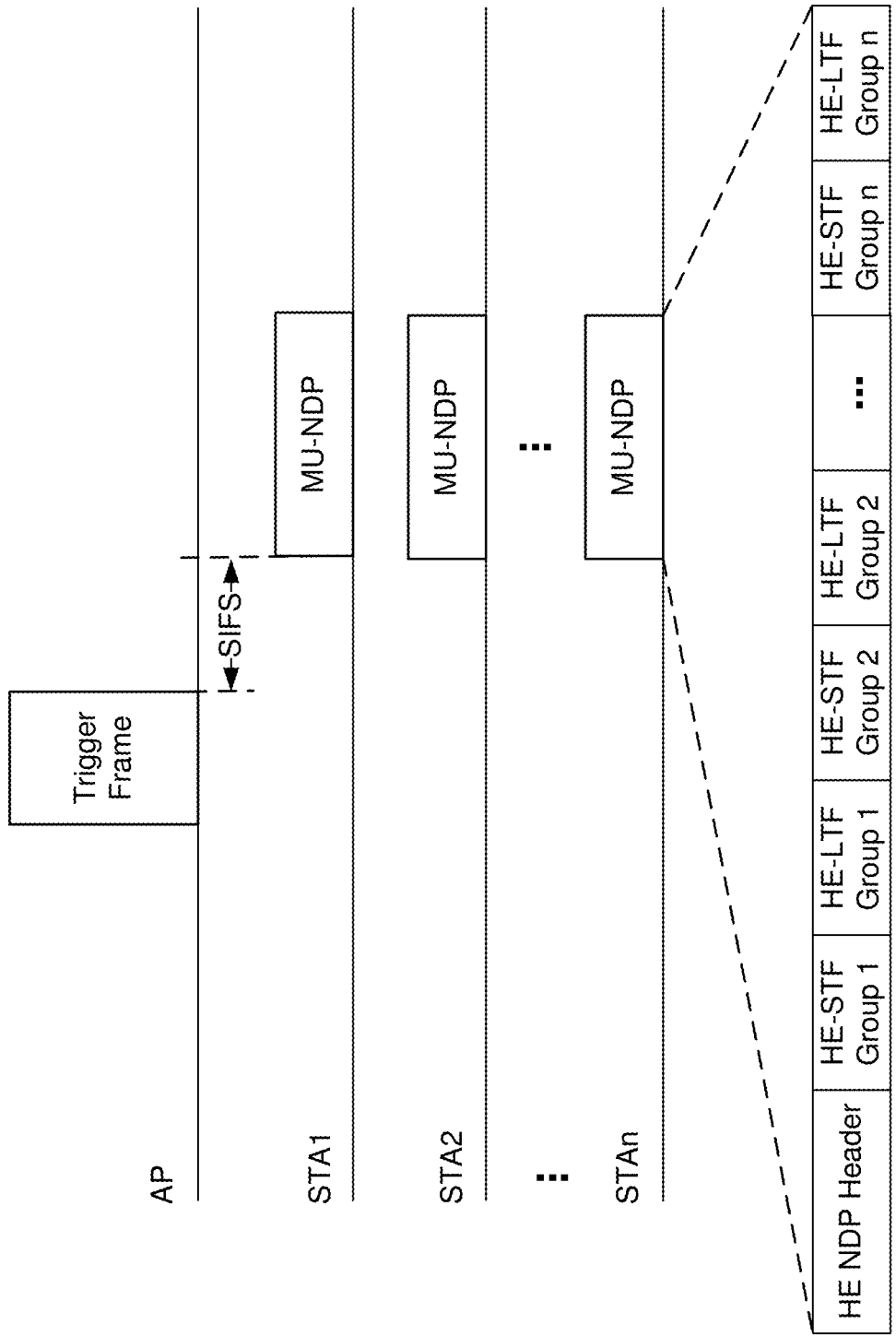

FIGS. 9-11 depict illustrative schematic diagrams for implicit channel state information, in accordance with one or more example embodiments of the present disclosure.

In the sequences of FIGS. 9-11, the scheduling or resource allocation for each STA group depends on the STAs status (ready or not) and the STA's RSSI at the AP side, and to mitigate the inter-STA interference at the receiver of AP, the AP should allocate the STAs with similar RSSI in the same group. But in the above sequences, no method is proposed for the AP to check the STA's status and measure the STA's RSSI.

Figure 12:
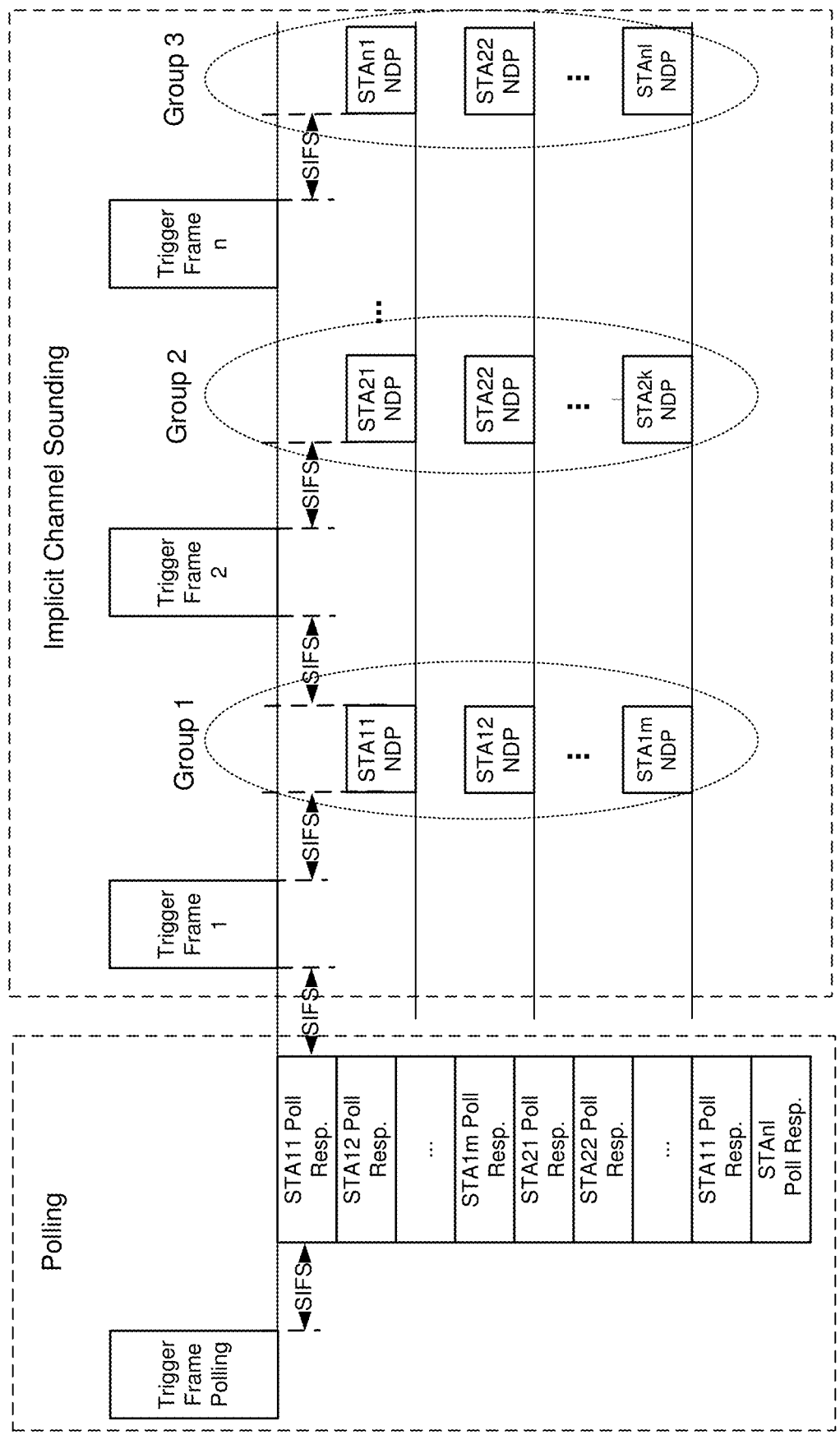
FIG. 12 depicts an illustrative schematic diagram for implicit channel sounding with polling, in accordance with one or more example embodiments of the present disclosure.

FIG. 12 depicts an illustrative schematic diagram for implicit channel sounding with polling, in accordance with one or more example embodiments of the present disclosure.

It should be noted that the implicit channel sounding part in FIG. 12 can be any one of the three options described in FIGS. 9-11. For simplicity, only the channel sounding of FIG. 9 is used as an example.

In one or more embodiments, the trigger frame polling, the AP uses STA's AID or other ID to allocate resource for the STA. For example, if poll response is OFDMA-based, the resource allocation can be the RU index, and each STA is allocated an RU for poll response transmission and if the poll response is short NDP feedback-based, the resource allocation can be tone set index. The STA can use a poll response to indicate whether it's ready for implicit channel. Also, in the trigger frame polling, the AP includes its own transmit power and sets a target RSSI for the poll response from STA, and each STA will adjust its transmit power based on the received trigger frame polling and based on the actual receive signal power of poll response, the AP knows the STA's capability for power control and based on the poll response, the AP knows whether the STA is ready or not for implicit channel sounding. Further, the STA can include its power headroom in the poll response, and the power headroom indicates how much the current transmit power is below the STA's maximum transmit power, and it can also indicate whether the STA already uses its maximum power. Based on the poll response from STAs, the AP can allocate STAs into different groups for implicit channel sounding, and meanwhile maximize the NDP's target RSSI at AP side to improve channel estimation quality of uplink channel. Also, if a STA's transmit power is too low, the AP may decide to use an explicit sounding sequence for the STA for a better CSI quality. It is understood that the above descriptions are for purposes of illustration and are not meant to be limiting.

FIGS. 13-16 depict illustrative schematic diagrams for multi-user uplink channel sounding, in accordance with one or more example embodiments of the present disclosure.

One of the key features of the next generation Wi-Fi (i.e., Extremely High Throughput, EHT) is employing a larger number of antennas (co-located in a single AP or distributed in Multi-AP architecture) to achieve higher spatial multiplexing (SM) as well as BF performance gains. In the current 802.11ax specification, explicit channel sounding (via feedback from STAs) is supported to provide channel state information (CSI) at the transmitter. However, with the increasing number of antennas, the overhead induced by the feedback mechanism may degrade network efficiency. An efficient approach (in terms of overhead/performance tradeoffs), to provide timely CSI at the transmitter, relies on implicit beamforming feedback which requires uplink channel sounding and calculation of BF weights, at the transmitter, directly from the uplink channel. This relies on UL and DL channel reciprocity resulted from Time-Division Duplex (TDD) transmission in 802.11.

Figure 13:
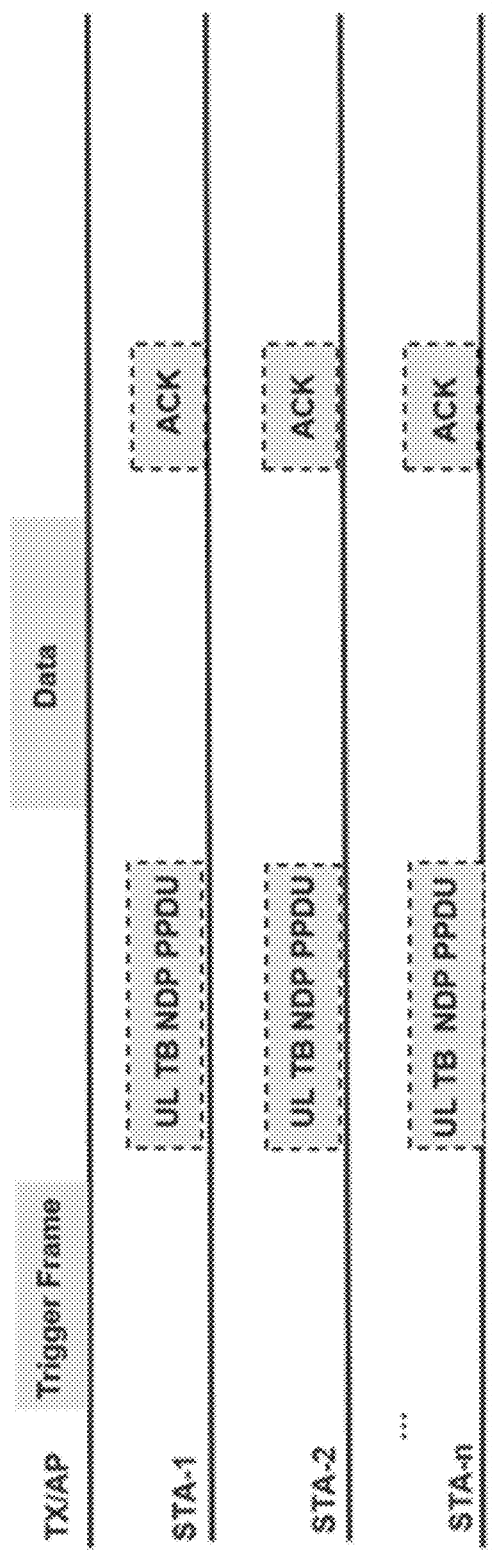
FIG. 13 depicts an illustrative schematic diagram for a trigger-based sequence for UL sounding, in accordance with one or more example embodiments of the present disclosure.

FIG. 13 depicts an illustrative schematic diagram for a trigger-based sequence for UL sounding, in accordance with one or more example embodiments of the present disclosure.

In FIG. 13, the trigger-based uplink sounding protocol enables implicit BF feedback in multiuser MIMO. In that case, a transmitter device such as an AP may send a trigger frame to a group of STAs (STA1-$n$). The STAs may respond by sending an uplink (UL) trigger based NDP frame (e.g., an NDP PPDU).

In one or more embodiments, a multi-user uplink channel sounding system may facilitate a sequence to enable the implementation of implicit BF feedback. A Trigger frame may initiate NDP transmission from the STAs. Each of the STAs may then transmit training fields in a UL such that the AP may calculate the BF weights directly from the received UL NDP transmissions. This results in a lower network overhead, less latency and a higher accuracy of BF weights.

In one or more embodiments, a multi-user uplink channel sounding may facilitate multiplexing schemes for NDP transmission from multiple STAs in UL.

In one or more embodiments, a multi-user uplink channel sounding system may facilitate spatial multiplexing. In IEEE 802.11ax, spatial multiplexing using matrix-P (can also be designated as P-matrix, which is an orthogonal matrix) is used for NDP transmission in DL as well as for long training field (LTF) transmission in MIMO MU (for channel estimation). The same idea is extended here such that the candidate STAs are directed to send NDP in UL multiplexed by matrix-P. Matrix-P is applied over multiple transmit antennas at each STA as well as across multiple STAs. The dimension of p-matrix is equal to a total number of transmit antennas of all STAs for MU BF. The details on HE LTF type, number of columns and ordering in matrix-P, for each user, all are defined in the trigger frame.

In one or more embodiments, if the STAs which are ordered to send NDP are experiencing very different path loss, the performance of this scheme may be impacted by inter-user interference.

In one or more embodiments, STAs can be also directed to send NDP sequentially in time. AP may group STAs based on their received signal power (RSSI) and schedule the ones with very different RSSI, in different time slots and the ones in similar path Loss range, for spatial multiplexing transmission. For time multiplexing two approaches are proposed.

Figure 14:
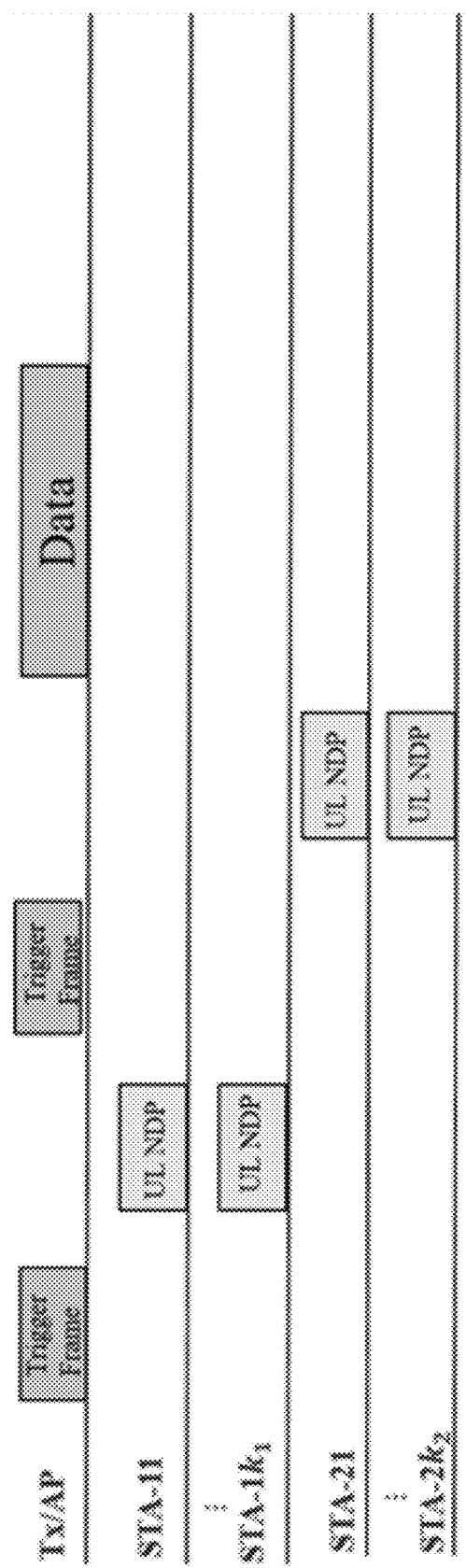
FIG. 14 depicts an illustrative schematic diagram for time and spatial multiplexing of NDP in UL, in accordance with one or more example embodiments of the present disclosure.

(A) Time Multiplexing Inside Channel Coherence Time:

A trigger frame is transmitted to the identified STAs (in the same group). Upon completion of channel sounding from the first group, another trigger frame is transmitted (after SIFS) to the second group of STAs. As shown in FIG. 14, this process continues to solicit the NDP from all STAs in different groups sequentially in time (inside coherence time of the channel). There is an overhead associated with this scheme as a result of the transmission of more than one trigger frame.

(B) Time Multiplexing in the Same PPDU:

In this scheme, NDP from all candidate STAs is solicited in the same PPDU. The ones in the same group-k (same RSSI) will be multiplexed by matrix-P with the same dimension as the number of STAs in group-k. Different groups may transmit NDPs sequentially. The transmissions are separated by a SIFS. The sequence is shown in FIG. 3, where two groups of STAs are assumed, one group has 4 STAs (P-matrix of size-4 is used to multiplex LTFs), the second group has two STAs (P-matrix of size-2 is used). This is more efficient than scheme-a (for TDMA multiplexing) as there is one trigger frame to solicit all NDP and also some redundant preamble overhead can be removed across different groups. The details of matrix-P for different groups are defined in the trigger frame.

In one or more embodiments, a multi-user uplink channel sounding system may facilitate frequency multiplexing. The idea is to multiplex training fields from different STAs in different frequency tones. In 802.11ax, explicit BF feedback reports may be transmitted in one tone out of 4 or 16 tones. Following the same idea of grouping for BF feedback reports, a multi-user uplink channel sounding system may transmit training fields from each STA in every 1 out of g of sub-carriers (g=4, 16). Multiple STAs can be scheduled to multiplex LTF in frequency tones. In this method, the channel is estimated in UL in every 1/g sub-carrier. The interpolation may be required at the receiver to estimate the channel in other tones. FIG. 16 presents a simplified configuration for this scheme. To implement this method, a multi-user uplink channel sounding system may facilitate employing 4× HE-LTF proposed in 802.1 lax. In this case, two examples for tone partitioning in 80 MHz (g=16), multiplexing 4 STAs and 40 MHz (g=4), multiplexing 4 and 2 STAs are shown in Tables 1, 2 and 3 respectively. These are two examples for presenting the scheme but do not exclude other BWs or group sizes (g). The 802.1 lax devices support 1× HE LTF and 2× HE LTF and therefore the interpolation can follow the conventional routine.

Various schemes were presented, including spatial, time and frequency multiplexing for LTF transmission from multiple STAs in the uplink. A combination of these schemes can be applied. The details of the multiplexing method (e.g., time, spatial, or frequency multiplexing) may be defined and included in the trigger frame.

FIG. 14 depicts an illustrative schematic diagram for time and spatial multiplexing of NDP in UL, in accordance with one or more example embodiments of the present disclosure.

Referring to FIG. 14, there is shown a group of STAs (STA-11 ... STA1$k_1$) that belong to the same group (RSSI) and are multiplexed by matrix-P2 (dimension of $k_1$). Further, STA-21 STA2$k_2$ are shown to belong to a second group (different RSSI than group-1), such that they are scheduled in a different time slot and multiplexed by matrix-P2 (dimension of $k_2$). That is the matrix-P1 and the matrix-P2 may have different dimensions). In this scenario, a first trigger frame is sent to the first group and after receiving the UL NDPs of the first group, the AP sends a second trigger frame to the second group, which elicits the UL NDPs of the second group.

Figure 15:
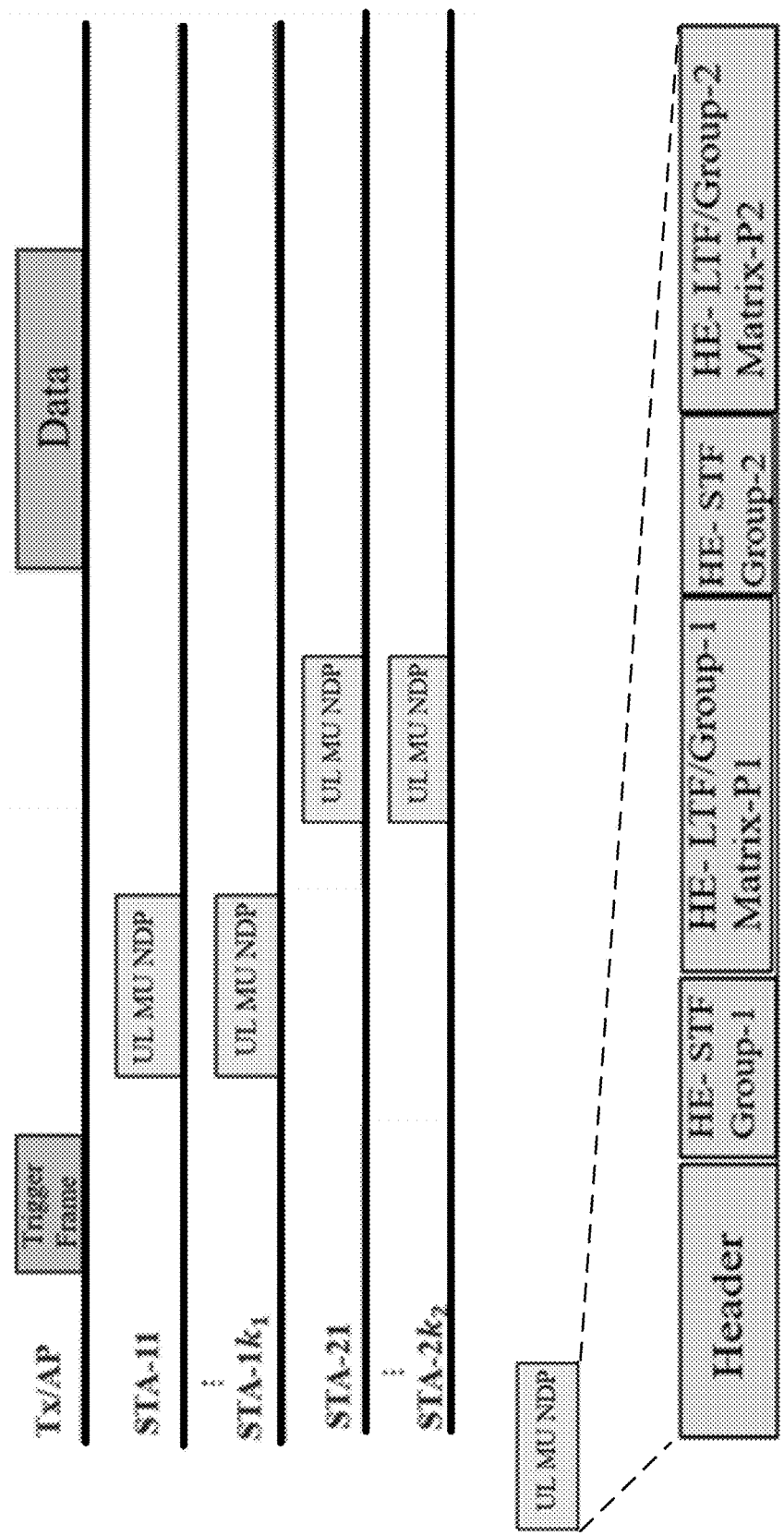
FIG. 15 depicts an illustrative schematic diagram for time and spatial multiplexing of NDP in UL, in accordance with one or more example embodiments of the present disclosure.

FIG. 15 depicts an illustrative schematic diagram for time and spatial multiplexing of NDP in UL, in accordance with one or more example embodiments of the present disclosure.

Referring to FIG. 15, there is shown time and spatial multiplexing of NDP in UL. STA-11 ... STA1$k_1$ belong to the first group (RSSI) and STA-21 ... STA2$k_2$ belong to the second group (different RSSI than group-1), they are scheduled in the same PPDU (e.g., the same trigger frame) but in different timing.

FIG. 16 depicts an illustrative schematic diagram for frequency multiplexing of training fields from multiple STAs in the uplink, in accordance with one or more example embodiments of the present disclosure.

As an example, the allocation of tones (also referred to as subcarriers) for the various STAs in various frequency bands is shown below.

TABLE 1

Example of Tone planning for frequency multiplexing of 4 STAs in 80 MHz:

| STA-1 | STA-2 | STA-3 | STA-4 |
|---|---|---|---|
| [−500:16:−4][12:16:492] | [−496:16:0] [16:16:496] | [−492:16:−12][4:16:500] | [−488:16:−8][8:16:488] |

TABLE 2

Example of Tone planning for frequency multiplexing of 4 STAs in 40 MHz:

| STA-1 | STA-2 | STA-3 | STA-4 |
|---|---|---|---|
| [−244:4:0][4:4:244] | [−243:4:−3][1:4:241] | [−242:4:−2][2:4:242] | [−241:4:−1][3:4:243] |

TABLE 3

Example of Tone planning for frequency multiplexing of 2 STAs in 40 MHz:

| STA-1 | STA-2 |
|---|---|
| [−244:4:0][4:4:244] | [−242:4:−2][2:4:242] |

It is understood that the above descriptions are for purposes of illustration and are not meant to be limiting.

FIGS. 17-21 depict illustrative schematic diagrams for CSI feedback, in accordance with one or more example embodiments of the present disclosure.

Figure 17:
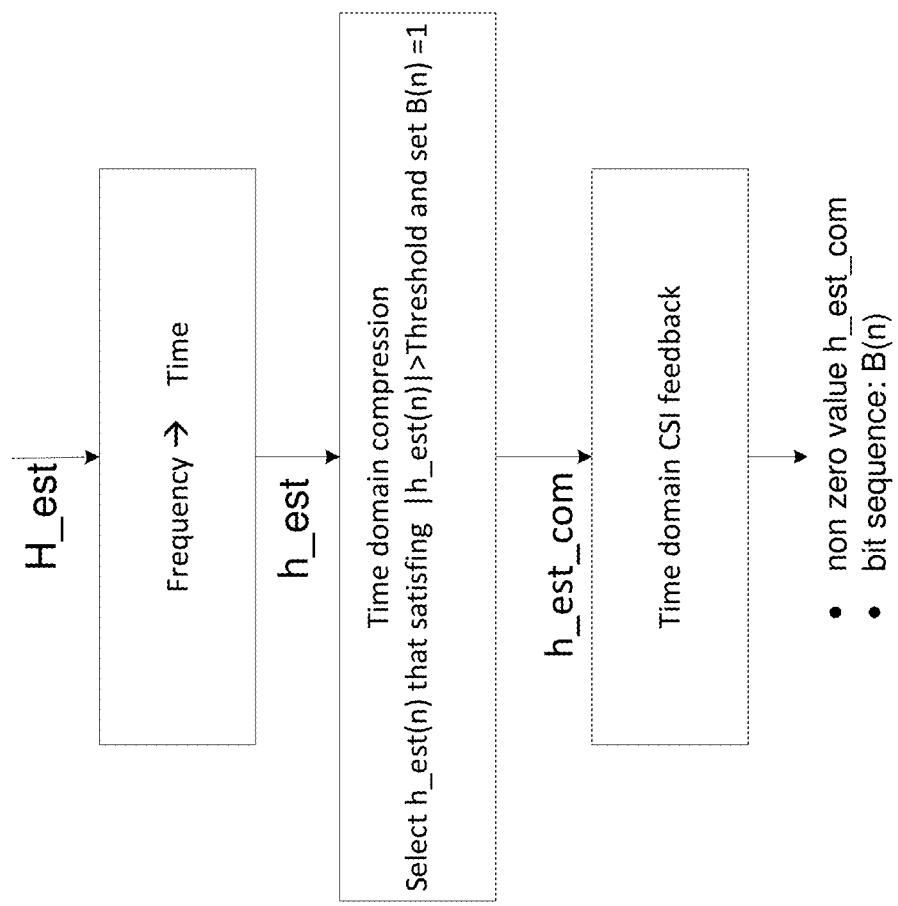
FIG. 17 depicts an illustrative schematic diagram for time domain compressed channel state information feedback, in accordance with one or more example embodiments of the present disclosure.

In one or more embodiments, a basic algorithm for time domain compressed CSI feedback is shown in FIG. 17.

FIG. 17 depicts an illustrative schematic diagram for time domain compressed channel state information feedback, in accordance with one or more example embodiments of the present disclosure.

Referring to FIG. 17, there is shown an advanced time domain compressed channel state information feedback method.

In one or more embodiments, assume H_est is the frequency domain estimated channel impulse response between a single Tx spatial stream and a single Rx antenna.

Step 0: if CSD is added to the spatial streams in the channel sounding NDP, then the corresponding CSD value needs first be removed in the frequency domain estimated channel impulse response H_est.

Step 1: Convert the estimated frequency-domain channel impulse response to the time domain channel impulse response: H_est→h_est, for example, using inverse discrete Fourier transform (IDFT).

Step 2:

Option 1: The number of feedback paths is varied

In one or more embodiments, a CSI feedback system may facilitate comparing each path of the estimated time domain channel impulse response within the cyclic prefix length, with a predefined threshold, then select the path that with the absolute value (or squared norm) larger than the predefined threshold as the feedback path:

$$h_{est(n)}: \begin{cases} \text{selected for feedback,} & \text{if } |h_{est(n)}| > \text{Threshold} \\ \text{dropped,} & \text{otherwise} \end{cases}$$

$n = 1, 2, \ldots, n\_CP$

With a selected path location indicator, which is represented with a bit sequence:

$$B(n) = \begin{cases} 1, & \text{if } |h_{est(n)}| > \text{Threshold} \\ 0, & \text{otherwise} \end{cases}, n = 1, 2, \ldots, n\_CP$$

Where n_CP is the number of samples within the cyclic prefix. The value of the threshold will be defined based on the accuracy requirement of the channel state information, the overhead constraint and the SNR of the channel estimation H_est. For example, if the SNR of H_est is low, then a high threshold may be required to filter out the noise. The value of the threshold can be indicated by the AP in the NDPA frame preceding the NDP frame used for channel sounding. The threshold may also be included in the STA's CSI report as a compression rate reference for the AP side.

Option 2: the number of the feedback path is predefined as a fixed value but maybe be different for different situations.

In one or more embodiments, a CSI feedback system may facilitate selecting the $n_{path}$ Path with the first largest absolute or squared norm value among of all of the path within the CP with a sample location indicator, which is represented with a bit sequence:

$$B(n) = \begin{cases} 1, & \text{if } h_{est(n)} \text{ is selected for feedback} \\ 0, & \text{otherwise} \end{cases}, n = 1, 2, \ldots, n\_CP$$

Where n_CP is the number of samples within the cyclic prefix. The number of the paths may be defined based on the accuracy requirement of the channel state information, the overhead constraint, the SNR of the channel estimation H_est and the environment. The number of paths can be indicated by the AP in the NDPA frame preceding the NDP frame used for channel sounding. The number of paths may also be included in the STA's CSI report to indicate the length of feedback CSI frame.

Step 3: For each Tx spatial stream and Rx antenna pair, feed the selected time domain paths, h_est_com, with the indicator, B(n) and the index for Tx spatial stream and Rx antenna index back to the transmitter.

Step 4: Upon the reception of the time domain compressed channel impulse response, h_est_com, with the indicator, B(n), and the corresponding index of the Tx spatial stream and Rx antenna index the transmitter can recover the time domain channel impulse response and then convert it back to the frequency domain channel impulse response for beamforming design.

Channel state information(CSI) report field:

Case 1: Single AP

The CSI report field is used by the CSI frame to carry the time domain compressed CSI to a transmitter Beamformer, FIG. 2 and Table 1 shows the definition of each field, where, nCP: is the length of the cyclic prefix length in samples, nCP bits I/O sequence is used as the bit map for the selected paths.

Nb: is the number of bits in representing the real and imaginary parts of each coefficient path.

nTx: is the number of the transmit antenna nRx: is the number of the receive antenna npath, 1,1, . . . , npath, nTx, nRx: is the number of the selected paths for feedback from first transmit antenna to the first receive antenna, . . . , nTxth transmit antenna to the nRxth antenna. Note: the number of the selected paths may be different if Option 1 is used in Step 2 and it will be indicated by the number of ones in the feedback path indicator field. The number of the selected paths will be fixed for each stream if option 1 is used in Step 2, but maybe set to be different fixed values according to practical requirement.

Figure 18:
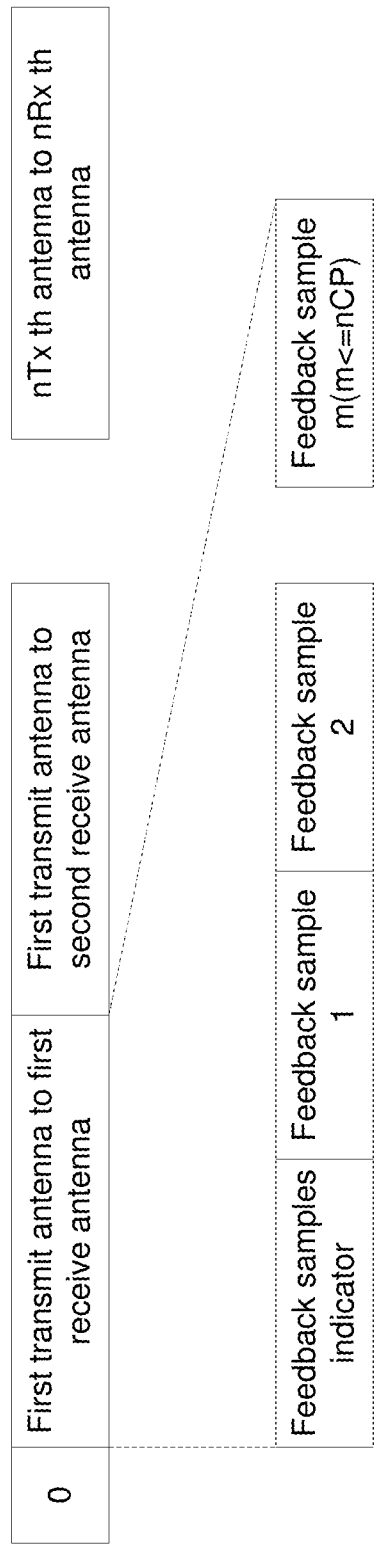
FIG. 18 depicts an illustrative schematic diagram for time domain compressed CSI report field format, in accordance with one or more example embodiments of the present disclosure.

FIG. 18 depicts an illustrative schematic diagram for time domain compressed CSI report field format, in accordance with one or more example embodiments of the present disclosure.

TABLE 1 time domain compressed CSI report field (20 MHz):

| Field | Size(bits) | Meaning |
|---|---|---|
| Bit map for the selected feedback paths | nCP | Indicator of the feedback paths (1/0) for the 1$^{st}$ selected path for first transmit antenna to first receive antenna pair |
| feedback value for the $_{1,1,1}{}^{th}$ path | 2xNb | Time domain channel impulse response for the 1$^{st}$ selected path for first transmit antenna to first receive antenna pair |
| . . . | . . . | . . . |
| feedback value for the $n_{path, 1,1}{}^{th}$ path | 2xNb | Time domain channel impulse response for the $n_{path}{}^{th}$ selected path for first transmit antenna to first receive antenna pair |
| Bit map for the selected feedback | nCP | Indicator of the feedback paths (1/0) for the 1$^{st}$ selected path for first transmit antenna to second |

TABLE 1-continued time domain compressed CSI report field (20 MHz):

| Field | Size(bits) | Meaning |
|---|---|---|
| paths | | receive antenna pair |
| feedback value for the $_{1,1,2}{}^{th}$ path | 2xNb | Time domain channel impulse response for the $1^{st}$ selected path for first transmit antenna to second receive antenna pair |
| . . . | . . . | . . . |
| feedback value for the $n_{path,1,2}{}^{th}$ path | 2xNb | Time domain channel impulse response for the $n_{path}{}^{th}$ selected path for first transmit antenna to second receive antenna pair |
| . . . | . . . | . . . |
| Bit map for the selected feedback paths | nCP | Indicator of the feedback paths (1/0) for the $nTx^{th}$ transmit antenna to $nRx^{th}$ receive antenna pair |
| feedback value for the $_{1,nTx,nRx}{}^{th}$ path | 2xNb | Time domain channel impulse response for the $1^{st}$ selected path for the $nTx^{th}$ transmit antenna to $nRx^{th}$ receive antenna pair |
| . . . | . . . | . . . |
| feedback value for the $n_{path,nTx,nRx}{}^{th}$ path | 2xNb | Time domain channel impulse response for the $n_{path}{}^{th}$ selected path for $nTx^{th}$ transmit antenna to $nRx^{th}$ receive antenna pair |

Case 2: Multiple AP:

In one or more embodiments, for the multi-AP scenario, the STA can receive NDP from multiple APs simultaneously as shown in FIG. 3 or receive NDP from multiple APs in series as shown in FIG. 4. For each NDP received from each AP, the STA can use the above-mentioned compression method to prepare the CSI feedback, and when the AP solicits the CSI report from STA, in the CSI report frame, the STA can include all the CSI feedback obtained from the multiple AP. If the NDP was sent by multiple APs simultaneously, the STA can use Table 1 and FIG. 2 to prepare the CSI report frame. However, if the NDP was sent by multiple APs in series, each CSI feedback for each AP need to define an index for identifying the corresponding AP, for example, using the BSSID or AID or some other AP id as shown in Table 2 and FIG. 5. After APs receiving the CSI report frame from STA, the AP can subtract the related CSI information for joint or coordinated data transmission.

Figure 19:
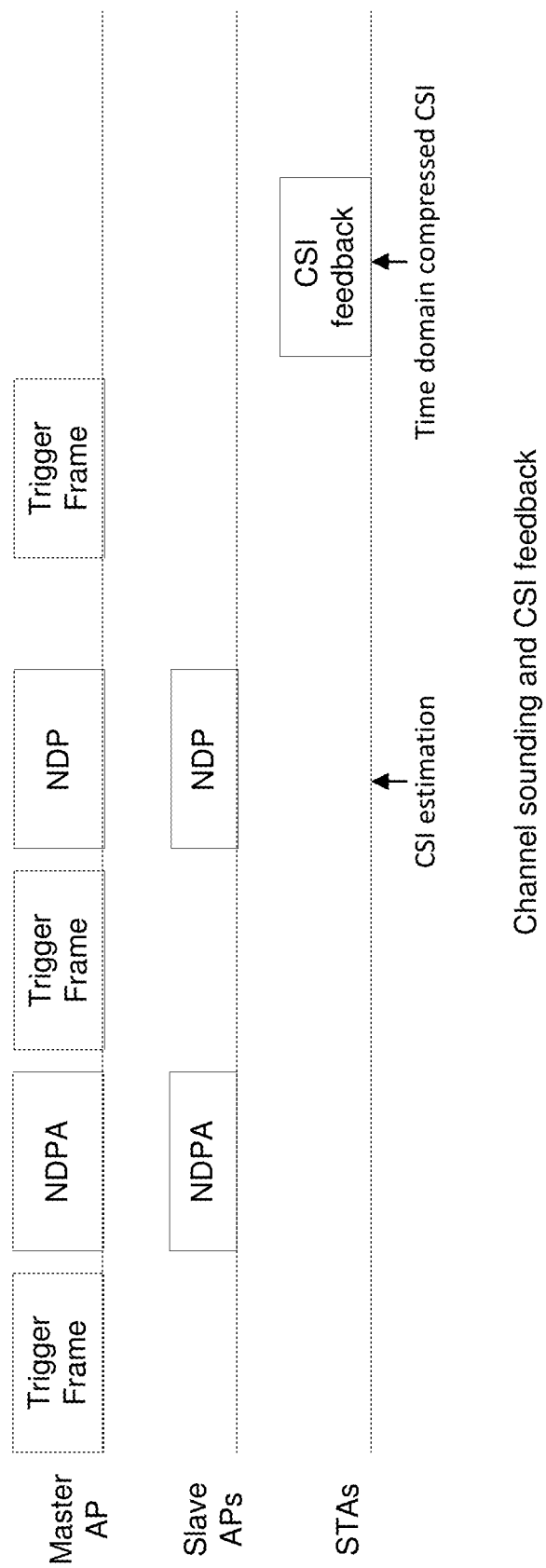
FIG. 19 depicts an illustrative schematic diagram for channel sounding and CSI feedback, in accordance with one or more example embodiments of the present disclosure.

FIG. 19 depicts an illustrative schematic diagram for channel sounding and CSI feedback, in accordance with one or more example embodiments of the present disclosure.

Figure 20:
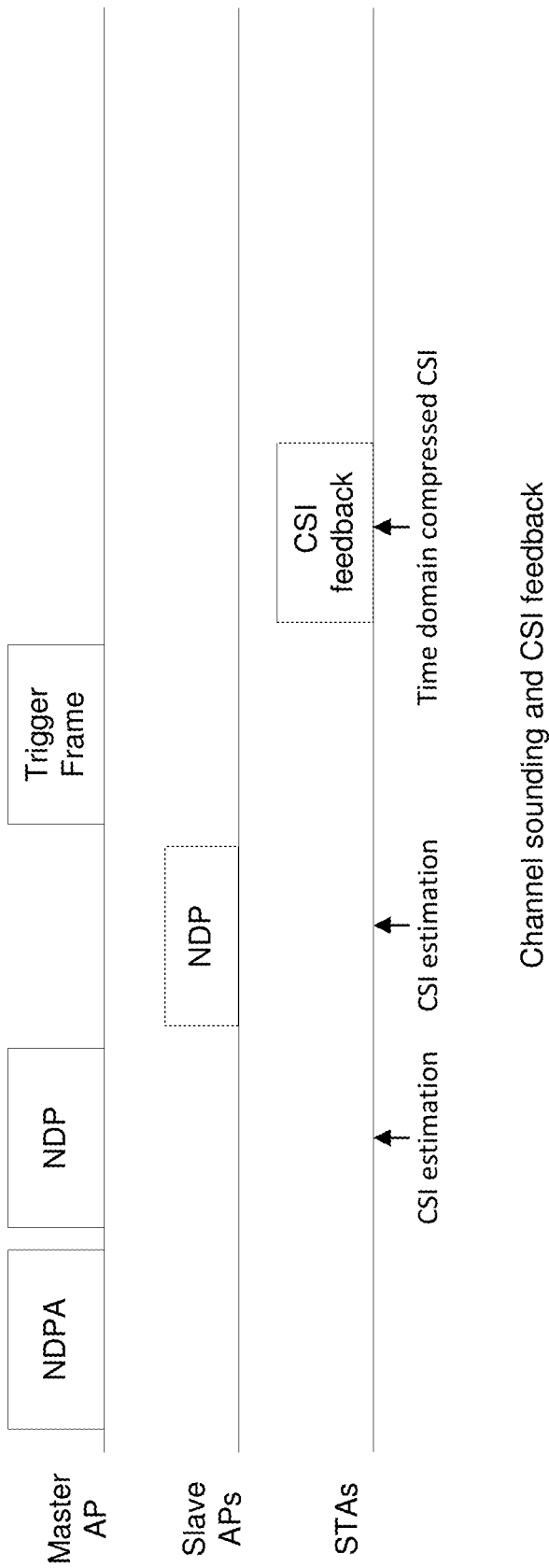
FIG. 20 depicts an illustrative schematic diagram for channel sounding and CSI feedback, in accordance with one or more example embodiments of the present disclosure.

FIG. 20 depicts an illustrative schematic diagram for channel sounding and CSI feedback, in accordance with one or more example embodiments of the present disclosure.

Figure 21:
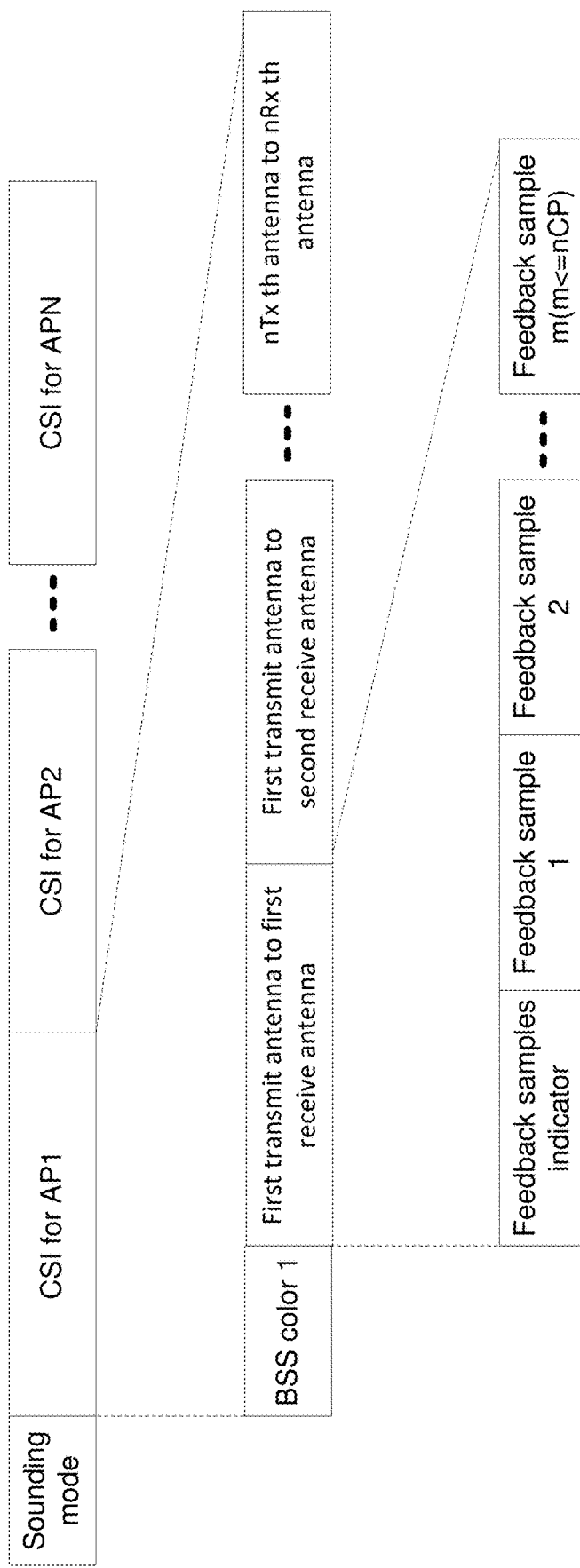
FIG. 21 depicts an illustrative schematic diagram for defining AP indices, in accordance with one or more example embodiments of the present disclosure.

FIG. 21 depicts an illustrative schematic diagram for defining AP indices, in accordance with one or more example embodiments of the present disclosure.

TABLE 2 time domain compressed CSI report field for multiple AP case(20 MHz)

| Field | Size(bits) | Meaning |
|---|---|---|
| BSS color for AP1 | 6 | Indicate that the following CSI is for AP1 |
| Bit map for the selected feedback paths | nCP | Indicator of the feedback paths (1/0) for first transmit antenna at AP 1 to first receive antenna pair |
| feedback value for the $_{1,1,1}{}^{th}$ path | 2xNb | Time domain channel impulse response for the $1^{st}$ selected path for first transmit antenna at AP1 to first receive antenna pair |
| . . . | . . . | . . . |
| feedback value for the $n_{path,1,1}{}^{th}$ path | 2xNb | Time domain channel impulse response for the $n_{path}{}^{th}$ selected path for first transmit antenna at AP1 to first receive antenna pair |
| Bit map for the selected feedback paths | nCP | Indicator of the feedback paths (1/0) for first transmit antenna at AP1 to second receive antenna pair |
| feedback value for the $_{1,1@AP1,2@STA}{}^{th}$ path | 2xNb | Time domain channel impulse response for the $1^{st}$ selected path for first transmit antenna at AP1 to second receive antenna pair |
| . . . | . . . | . . . |
| feedback value for the $n_{path,1@AP1,2@STA}{}^{th}$ path | 2xNb | Time domain channel impulse response for the $n_{path}{}^{th}$ selected path for first transmit antenna at AP1 to second receive antenna pair |
| . . . | . . . | . . . |
| Bit map for the selected feedback paths | nCP | Indicator of the feedback paths (1/0) for the $nTx^{th}$ transmit antenna at AP1 to $nRx^{th}$ receive antenna pair |
| feedback value for the $_{1,nTx,@AP1,nRx,@STA}{}^{th}$ path | 2xNb | Time domain channel impulse response for the $1^{st}$ selected path for the $nTx^{th}$ transmit antenna at AP1 to $nRx^{th}$ receive antenna pair |
| . . . | . . . | . . . |

TABLE 2-continued time domain compressed CSI report field for multiple AP case(20 MHz)

| Field | Size(bits) | Meaning |
|---|---|---|
| feedback value for the $n_{path, nTx,@AP1, nRx,@STA}{}^{th}$ path | 2xNb | Time domain channel impulse response for the $n_{path}{}^{th}$ selected path for the $nTx^{th}$ transmit antenna at AP1 to $nRx^{th}$ receive antenna pair |
| ... | ... | ... |
| BSS color for AP N | 6 | Indicate that the following CSI is for AP N |
| Bit map for the selected feedback paths | nCP | Indicator of the feedback paths (1/0) for first transmit antenna at AP N to first receive antenna pair |
| feedback value for the $_{1,1@AP\ N,\ 1@STA}{}^{th}$ path | 2xNb | Time domain channel impulse response for the $1^{st}$ selected path for first transmit antenna at AP N to first receive antenna pair |
| ... | ... | ... |
| feedback value for the $n_{path,\ 1@AP\ N,\ 1@STA}{}^{th}$ path | 2xNb | Time domain channel impulse response for the $n_{path}{}^{th}$ selected path for first transmit antenna at AP N to first receive antenna pair |
| Bit map for the selected feedback paths | nCP | Indicator of the feedback paths (1/0) for first transmit antenna at AP N to second receive antenna pair |
| feedback value for the $_{1,1@AP\ N,\ 2@STA}{}^{th}$ path | 2xNb | Time domain channel impulse response for the $1^{st}$ selected path for first transmit antenna at AP N to second receive antenna pair |
| ... | ... | ... |
| feedback value for the $n_{path,1@AP\ N,\ 2@STA}{}^{th}$ path | 2xNb | Time domain channel impulse response for the $n_{path,}{}^{th}$ selected path for first transmit antenna at AP N to second receive antenna pair |
| ... | ... | ... |
| Indicator of the feedback paths | nCP | Indicator of the feedback paths (1/0) for the $nTx^{th}$ transmit antenna at AP N to $nRx^{th}$ receive antenna pair |
| feedback value for the $_{1,nTx,@AP\ N,\ nRx,@STA}{}^{th}$ path | 2xNb | Time domain channel impulse response for the $1^{st}$ selected path for $nTx^{th}$ transmit antenna at AP N to $nRx^{th}$ receive antenna pair |
| ... | ... | ... |
| feedback value for the $n_{path,\ nTx,@AP\ N,\ nRx,@STA}{}^{th}$ path | 2xNb | Time domain channel impulse response for the $n_{path}{}^{th}$ selected path for $nTx^{th}$ transmit antenna at AP N to $nRx^{th}$ receive antenna pair |

Figure 22:
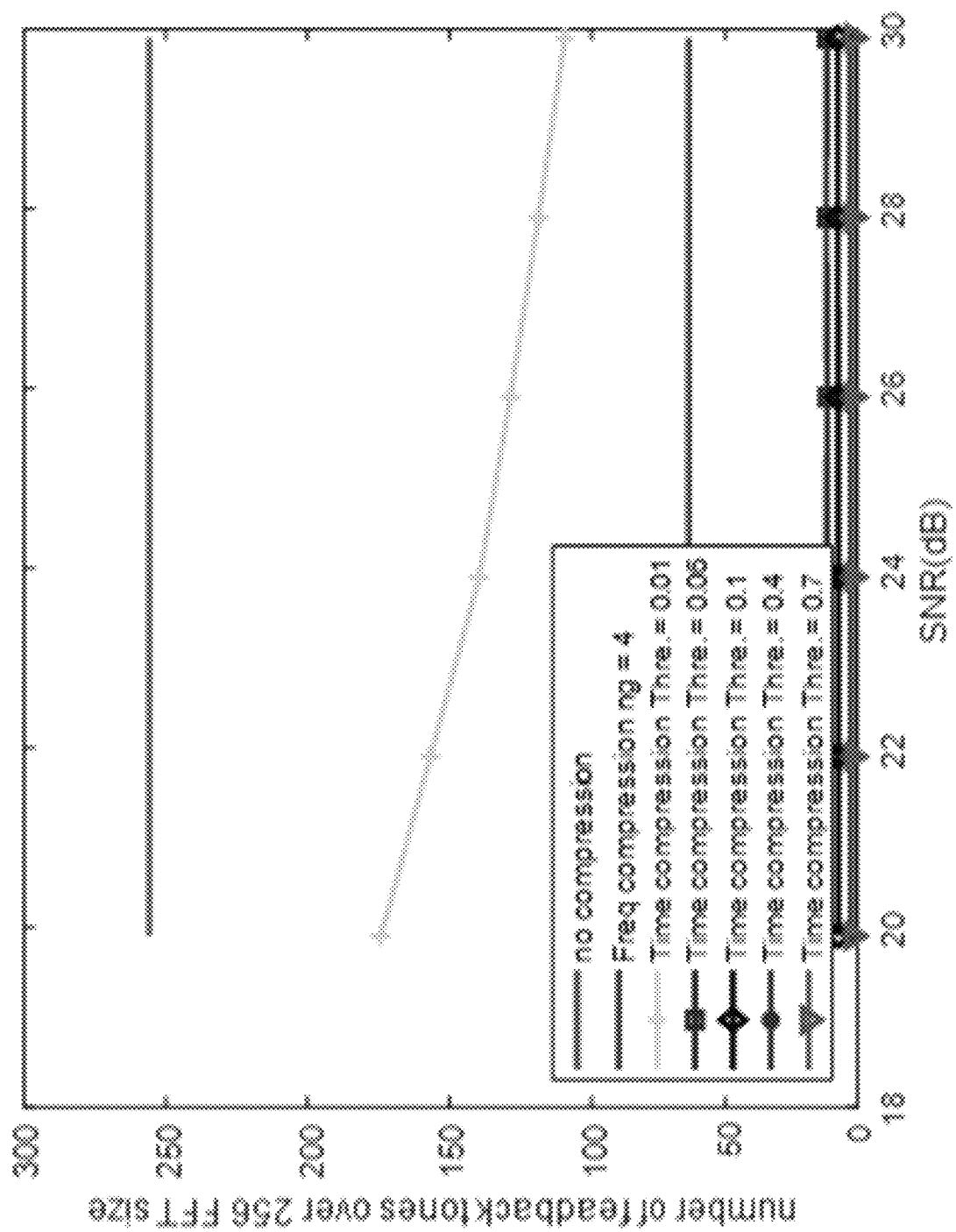
FIGS. 22-24 depict illustrative schematic diagrams for simulation results, in accordance with one or more example embodiments of the present disclosure.
Figure 23:
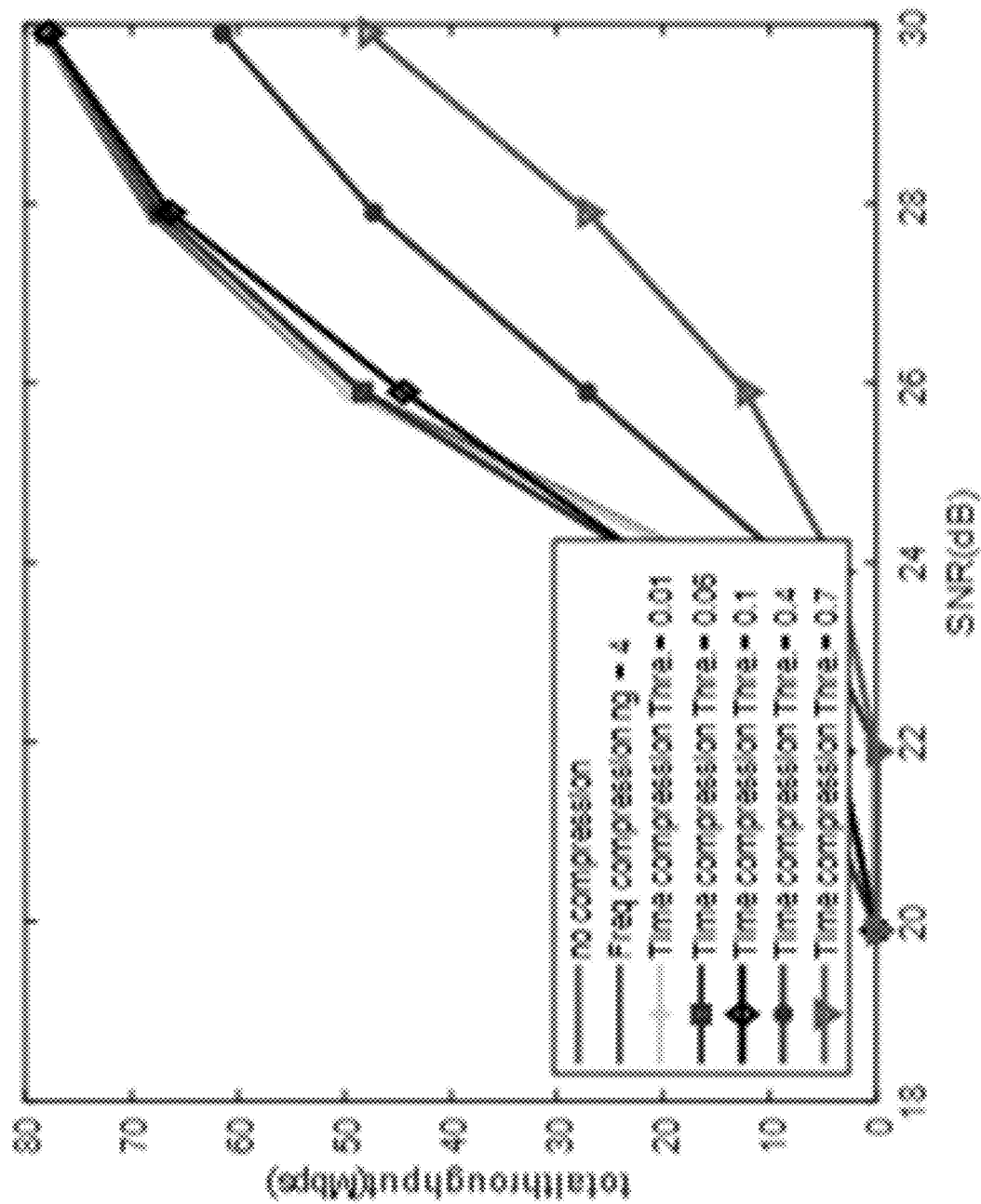

FIGS. 22-23 depict illustrative schematic diagrams for simulation results, in accordance with one or more example embodiments of the present disclosure.

Figure 24:
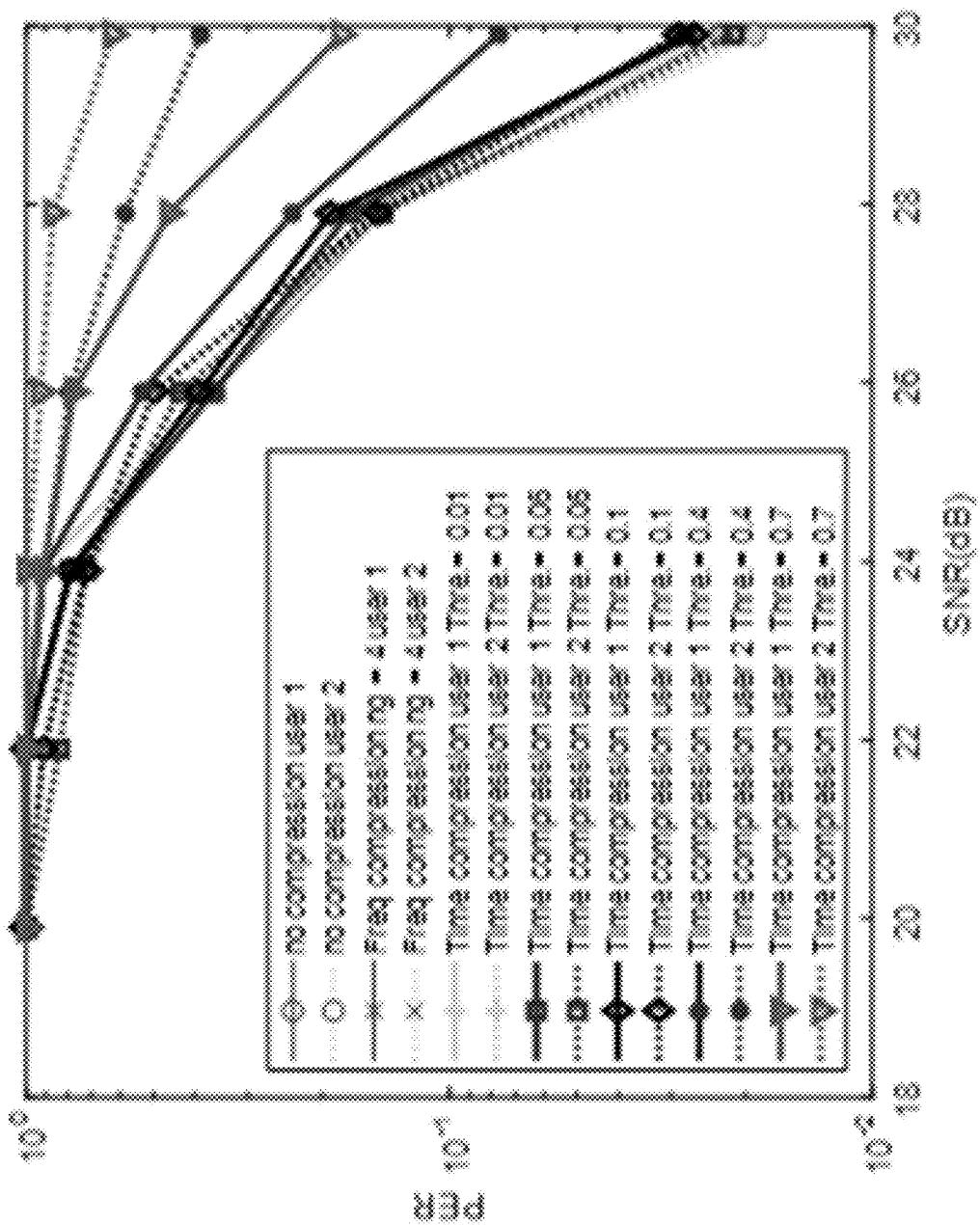

The time domain compressed approach can be applied to DL/UL SU or MU MIMO, multiple AP joint transmission. To better understand the performance of this approach, a simple simulation is conducted to verify the benefit. In this simulation, the AP has four antennas and send data to two STAs with DL MU MIMO, each with one spatial stream and two antennas. FIG. 22 shows the number samples needed to be feedback without compression, frequency domain compression (Ng=4), and time domain compression approach mentioned with different normalized threshold values. The normalized threshold is defined as the ratio between the threshold and the maximum absolute value of time domain channel impulse response. It may be seen that the larger the threshold, the less the samples need to be feedback. FIG. 23 shows the DL throughput without consideration of the overhead due to the channel sounding. FIG. 24 shows the packet error ratio (PER) performance for the two users with different compression approaches. It may be seen that when the normalized threshold is set to be 0.1, the number of samples needs to be feedback is less than 20, and there is no performance degradation in terms of the throughput and the per performance as shown in FIG. 7 and FIG. 8. The overhead of time domain compression method is less than 20 compared with 64 for the proposed vs the conventional frequency domain downsampling feedback for about the same PER performance. The overhead reduction comes from the sparse multipath profile, where only a handful of significant channel multipath and lots of insignificant multipath intermixed within the maximum delay.

It is understood that the above descriptions are for purposes of illustration and are not meant to be limiting.

Figure 25:
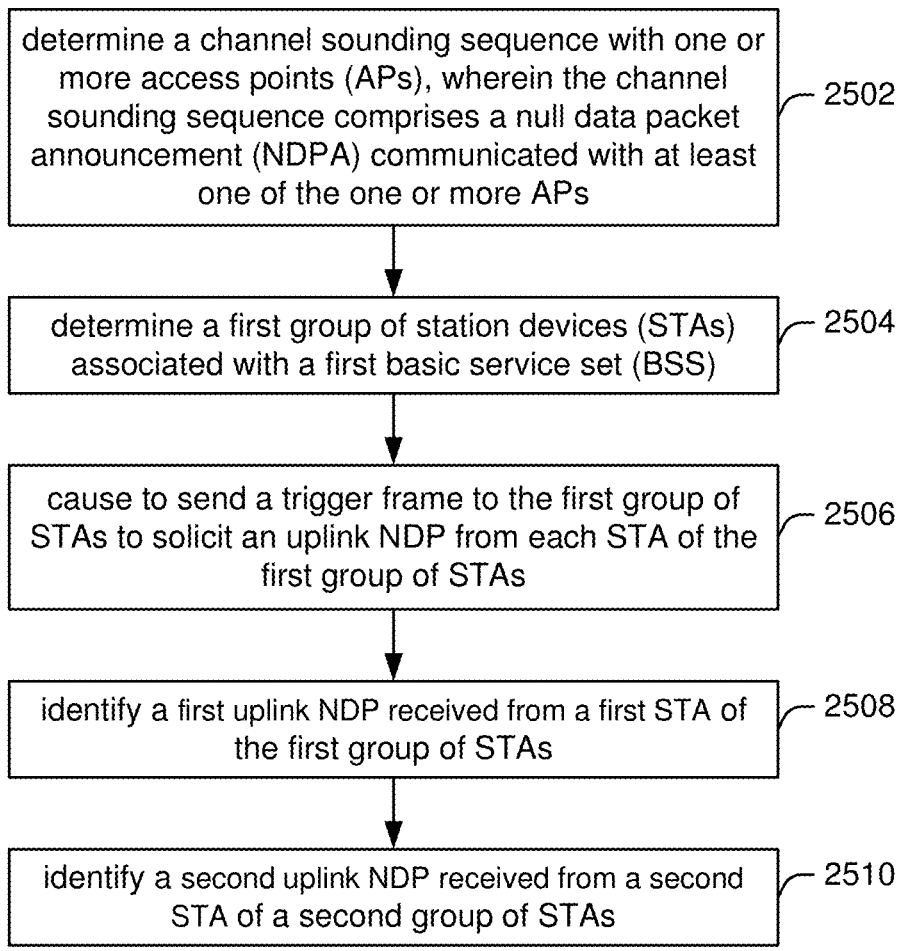
FIG. 25 illustrates a flow diagram of an illustrative process for an enhanced channel sounding system, in accordance with one or more example embodiments of the present disclosure.

FIG. 25 illustrates a flow diagram of illustrative process 2500 for a multi-user uplink channel sounding system, in accordance with one or more example embodiments of the present disclosure.

At block 2502, a device (e.g., the user device(s) 120 and/or the AP 102 of FIG. 1) may determine a channel sounding sequence with one or more access points (APs), wherein the channel sounding sequence comprises a null data packet announcement (NDPA) communicated with at least one of the one or more APs.

At block 2504, the device may determine a first group of station devices (STAs) associated with a first basic service set (BSS).

At block 2506, the device may cause to send a trigger frame to the first group of STAs to solicit an uplink NDP from each STA of the first group of STAs.

At block 2508, the device may identify a first uplink NDP received from a first STA of the first group of STAs.

At block 2510, the device may identify a second uplink NDP received from a second STA of a second group of STAs.

It is understood that the above descriptions are for purposes of illustration and are not meant to be limiting.

FIG. 26 shows a functional diagram of an exemplary communication station 2600, in accordance with one or more example embodiments of the present disclosure. In one embodiment, FIG. 26 illustrates a functional block diagram of a communication station that may be suitable for use as an AP 102 (FIG. 1) or a user device 120 (FIG. 1) in accordance with some embodiments. The communication station 2600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 2600 may include communications circuitry 2602 and a transceiver 2610 for transmitting and receiving signals to and from other communication stations using one or more antennas 2601. The communications circuitry 2602 may include circuitry that can operate the physical layer (PHY) communications and/or medium access control (MAC) communications for controlling access to the wireless medium, and/or any other communications layers for transmitting and receiving signals. The communication station 2600 may also include processing circuitry 2606 and memory 2608 arranged to perform the operations described herein. In some embodiments, the communications circuitry 2602 and the processing circuitry 2606 may be configured to perform operations detailed in the above figures, diagrams, and flows.

In accordance with some embodiments, the communications circuitry 2602 may be arranged to contend for a wireless medium and configure frames or packets for communicating over the wireless medium. The communications circuitry 2602 may be arranged to transmit and receive signals. The communications circuitry 2602 may also include circuitry for modulation/demodulation, upconversion/downconversion, filtering, amplification, etc. In some embodiments, the processing circuitry 2606 of the communication station 2600 may include one or more processors. In other embodiments, two or more antennas 2601 may be coupled to the communications circuitry 2602 arranged for sending and receiving signals. The memory 2608 may store information for configuring the processing circuitry 2606 to perform operations for configuring and transmitting message frames and performing the various operations described herein. The memory 2608 may include any type of memory, including non-transitory memory, for storing information in a form readable by a machine (e.g., a computer). For example, the memory 2608 may include a computer-readable storage device, read-only memory (ROM), random-access memory (RAM), magnetic disk storage media, optical storage media, flash-memory devices and other storage devices and media.

In some embodiments, the communication station 2600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 2600 may include one or more antennas 2601. The antennas 2601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 2600 may include one or more of a keyboard, a display, a non-volatile memory port, multiple antennas, a graphics processor, an application processor, speakers, and other mobile device elements. The display may be an LCD screen including a touch screen.

Although the communication station 2600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 2600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 2600 may include one or more processors and may be configured with instructions stored on a computer-readable storage device.

FIG. 27 illustrates a block diagram of an example of a machine 2700 or system upon which any one or more of the techniques (e.g., methodologies) discussed herein may be performed. In other embodiments, the machine 2700 may operate as a standalone device or may be connected (e.g., networked) to other machines. In a networked deployment, the machine 2700 may operate in the capacity of a server machine, a client machine, or both in server-client network environments. In an example, the machine 2700 may act as a peer machine in peer-to-peer (P2P) (or other distributed) network environments. The machine 2700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 2700 may include a hardware processor 2702 (e.g., a central processing unit (CPU), a graphics processing unit (GPU), a hardware processor core, or any combination thereof), a main memory 2704 and a static memory 2706, some or all of which may communicate with each other via an interlink (e.g., bus) 2708. The machine 2700 may further include a power management device 2732, a graphics display device 2710, an alphanumeric input device 2712 (e.g., a keyboard), and a user interface (UI) navigation device 2714 (e.g., a mouse). In an example, the graphics display device 2710, alphanumeric input device 2712, and UI navigation device 2714 may be a touch screen display. The machine 2700 may additionally include a storage device (i.e., drive unit) 2716, a signal generation device 2718 (e.g., a speaker), a multi-user uplink channel sounding device 2719, a network interface device/transceiver 2720 coupled to antenna(s) 2730, and one or more sensors 2728, such as a global positioning system (GPS) sensor, a compass, an accelerometer, or other sensor. The machine 2700 may include an output controller 2734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 2702 for generation and processing of the baseband signals and for controlling operations of the main memory 2704, the storage device 2716, and/or the multi-user uplink channel sounding device 2719. The baseband processor may be provided on a single radio card, a single chip, or an integrated circuit (IC).

The storage device 2716 may include a machine readable medium 2722 on which is stored one or more sets of data structures or instructions 2724 (e.g., software) embodying or utilized by any one or more of the techniques or functions described herein. The instructions 2724 may also reside, completely or at least partially, within the main memory 2704, within the static memory 2706, or within the hardware processor 2702 during execution thereof by the machine 2700. In an example, one or any combination of the hardware processor 2702, the main memory 2704, the static memory 2706, or the storage device 2716 may constitute machine-readable media.

The multi-user uplink channel sounding device 2719 may carry out or perform any of the operations and processes (e.g., process 2500) described and shown above.

It is understood that the above are only a subset of what the multi-user uplink channel sounding device 2719 may be configured to perform and that other functions included throughout this disclosure may also be performed by the multi-user uplink channel sounding device 2719.

While the machine-readable medium 2722 is illustrated as a single medium, the term "machine-readable medium" may include a single medium or multiple media (e.g., a centralized or distributed database, and/or associated caches and servers) configured to store the one or more instructions 2724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 2700 and that cause the machine 2700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 2724 may further be transmitted or received over a communications network 2726 using a transmission medium via the network interface device/transceiver 2720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 2720 may include one or more physical jacks (e.g., Ethernet, coaxial, or phone jacks) or one or more antennas to connect to the communications network 2726. In an example, the network interface device/transceiver 2720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 2700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 28:
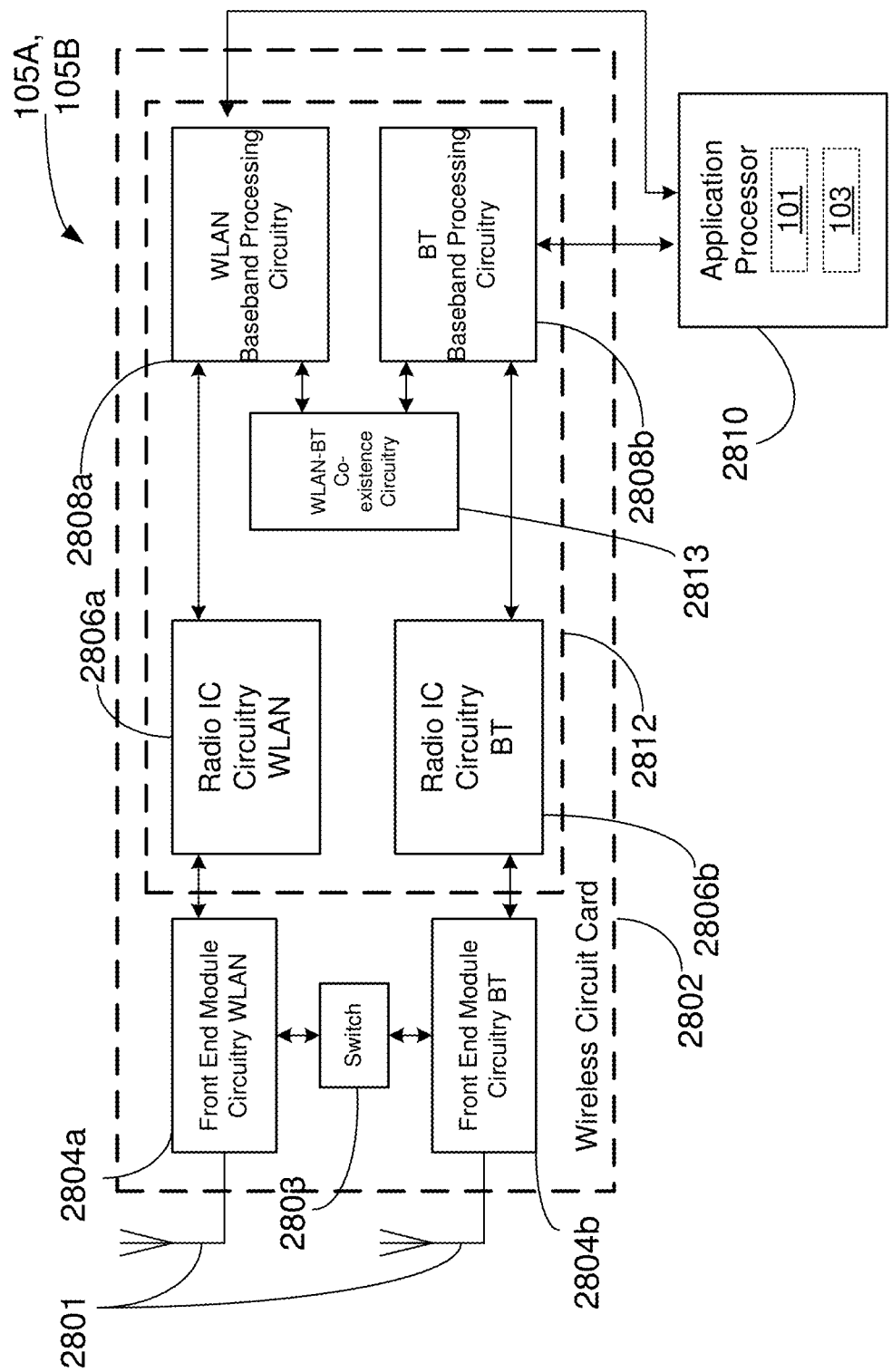
FIG. 28 is a block diagram of a radio architecture in accordance with some examples.

FIG. 28 is a block diagram of a radio architecture 105A, 105B in accordance with some embodiments that may be implemented in any one of the example AP 100 and/or the example STA 102 of FIG. 1. Radio architecture 105A, 105B may include radio front-end module (FEM) circuitry 2804a-b, radio IC circuitry 2806a-b and baseband processing circuitry 2808a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 2804a-b may include a WLAN or Wi-Fi FEM circuitry 2804a and a Bluetooth (BT) FEM circuitry 2804b. The WLAN FEM circuitry 2804a may include a receive signal path comprising circuitry configured to operate on WLAN RF signals received from one or more antennas 2801, to amplify the received signals and to provide the amplified versions of the received signals to the WLAN radio IC circuitry 2806a for further processing. The BT FEM circuitry 2804b may include a receive signal path which may include circuitry configured to operate on BT RF signals received from one or more antennas 2801, to amplify the received signals and to provide the amplified versions of the received signals to the BT radio IC circuitry 2806b for further processing. FEM circuitry 2804a may also include a transmit signal path which may include circuitry configured to amplify WLAN signals provided by the radio IC circuitry 2806a for wireless transmission by one or more of the antennas 2801. In addition, FEM circuitry 2804b may also include a transmit signal path which may include circuitry configured to amplify BT signals provided by the radio IC circuitry 2806b for wireless transmission by the one or more antennas. In the embodiment of FIG. 28, although FEM 2804a and FEM 2804b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 2806a-b as shown may include WLAN radio IC circuitry 2806a and BT radio IC circuitry 2806b. The WLAN radio IC circuitry 2806a may include a receive signal path which may include circuitry to down-convert WLAN RF signals received from the FEM circuitry 2804a and provide baseband signals to WLAN baseband processing circuitry 2808a. BT radio IC circuitry 2806b may in turn include a receive signal path which may include circuitry to down-convert BT RF signals received from the FEM circuitry 2804b and provide baseband signals to BT baseband processing circuitry 2808b. WLAN radio IC circuitry 2806a may also include a transmit signal path which may include circuitry to up-convert WLAN baseband signals provided by the WLAN baseband processing circuitry 2808a and provide WLAN RF output signals to the FEM circuitry 2804a for subsequent wireless transmission by the one or more antennas 2801. BT radio IC circuitry 2806b may also include a transmit signal path which may include circuitry to up-convert BT baseband signals provided by the BT baseband processing circuitry 2808b and provide BT RF output signals to the FEM circuitry 2804b for subsequent wireless transmission by the one or more antennas 2801. In the embodiment of FIG. 28, although radio IC circuitries 2806a and 2806b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 2808a-b may include a WLAN baseband processing circuitry 2808a and a BT baseband processing circuitry 2808b. The WLAN baseband processing circuitry 2808a may include a memory, such as, for example, a set of RAM arrays in a Fast Fourier Transform or Inverse Fast Fourier Transform block (not shown) of the WLAN baseband processing circuitry 2808a. Each of the WLAN baseband circuitry 2808a and the BT baseband circuitry 2808b may further include one or more processors and control logic to process the signals received from the corresponding WLAN or BT receive signal path of the radio IC circuitry 2806a-b, and to also generate corresponding WLAN or BT baseband signals for the transmit signal path of the radio IC circuitry 2806a-b. Each of the baseband processing circuitries 2808a and 2808b may further include physical layer (PHY) and medium access control layer (MAC) circuitry, and may further interface with a device for generation and processing of the baseband signals and for controlling operations of the radio IC circuitry 2806a-b.

Referring still to FIG. 28, according to the shown embodiment, WLAN-BT coexistence circuitry 2813 may include logic providing an interface between the WLAN baseband circuitry 2808a and the BT baseband circuitry 2808b to enable use cases requiring WLAN and BT coexistence. In addition, a switch 2803 may be provided between the WLAN FEM circuitry 2804a and the BT FEM circuitry 2804b to allow switching between the WLAN and BT radios according to application needs. In addition, although the antennas 2801 are depicted as being respectively connected to the WLAN FEM circuitry 2804a and the BT FEM circuitry 2804b, embodiments include within their scope the sharing of one or more antennas as between the WLAN and BT FEMs, or the provision of more than one antenna connected to each of FEM 2804a or 2804b.

In some embodiments, the front-end module circuitry 2804a-b, the radio IC circuitry 2806a-b, and baseband processing circuitry 2808a-b may be provided on a single radio card, such as wireless radio card 2802. In some other embodiments, the one or more antennas 2801, the FEM circuitry 2804a-b and the radio IC circuitry 2806a-b may be provided on a single radio card. In some other embodiments, the radio IC circuitry 2806a-b and the baseband processing circuitry 2808*a-b* may be provided on a single chip or integrated circuit (IC), such as IC 2812.

In some embodiments, the wireless radio card 2802 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 2808*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 29:
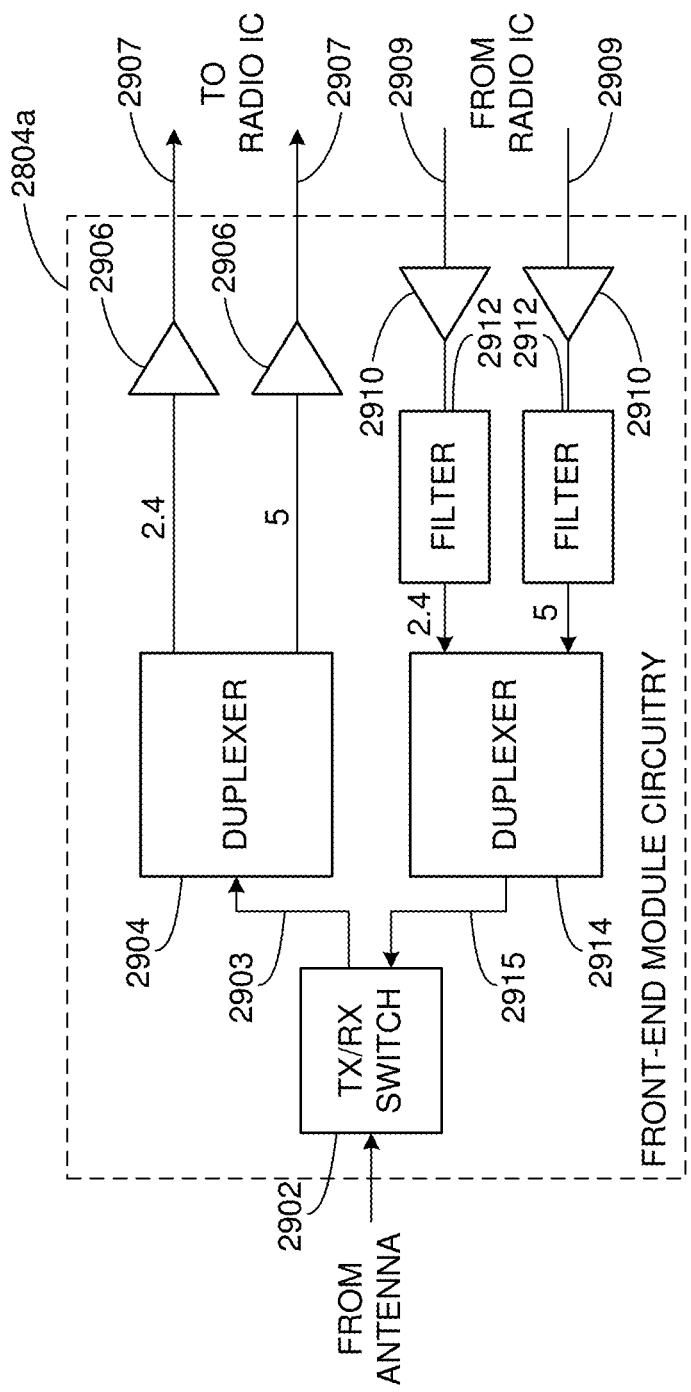
FIG. 29 illustrates an example front-end module circuitry for use in the radio architecture of FIG. 28, in accordance with one or more example embodiments of the present disclosure.

FIG. 29 illustrates WLAN FEM circuitry 2804*a* in accordance with some embodiments. Although the example of FIG. 29 is described in conjunction with the WLAN FEM circuitry 2804*a*, the example of FIG. 29 may be described in conjunction with the example BT FEM circuitry 2804*b* (FIG. 28), although other circuitry configurations may also be suitable.

In some embodiments, the FEM circuitry 2804*a* may include a TX/RX switch 2902 to switch between transmit mode and receive mode operation. The FEM circuitry 2804*a* may include a receive signal path and a transmit signal path. The receive signal path of the FEM circuitry 2804*a* may include a low-noise amplifier (LNA) 2906 to amplify received RF signals 2903 and provide the amplified received RF signals 2907 as an output (e.g., to the radio IC circuitry 2806*a-b* (FIG. 28)). The transmit signal path of the circuitry 2804*a* may include a power amplifier (PA) to amplify input RF signals 2909 (e.g., provided by the radio IC circuitry 2806*a-b*), and one or more filters 2912, such as band-pass filters (BPFs), low-pass filters (LPFs) or other types of filters, to generate RF signals 2915 for subsequent transmission (e.g., by one or more of the antennas 2801 (FIG. 28)) via an example duplexer 2914.

In some dual-mode embodiments for Wi-Fi communication, the FEM circuitry 2804*a* may be configured to operate in either the 2.4 GHz frequency spectrum or the 5 GHz frequency spectrum. In these embodiments, the receive signal path of the FEM circuitry 2804*a* may include a receive signal path duplexer 2904 to separate the signals from each spectrum as well as provide a separate LNA 2906 for each spectrum as shown. In these embodiments, the transmit signal path of the FEM circuitry 2804*a* may also include a power amplifier 2910 and a filter 2912, such as a BPF, an LPF or another type of filter for each frequency spectrum and a transmit signal path duplexer 2904 to provide the signals of one of the different spectrums onto a single transmit path for subsequent transmission by the one or more of the antennas 2801 (FIG. 28). In some embodiments, BT communications may utilize the 2.4 GHz signal paths and may utilize the same FEM circuitry 2804*a* as the one used for WLAN communications.

Figure 30:
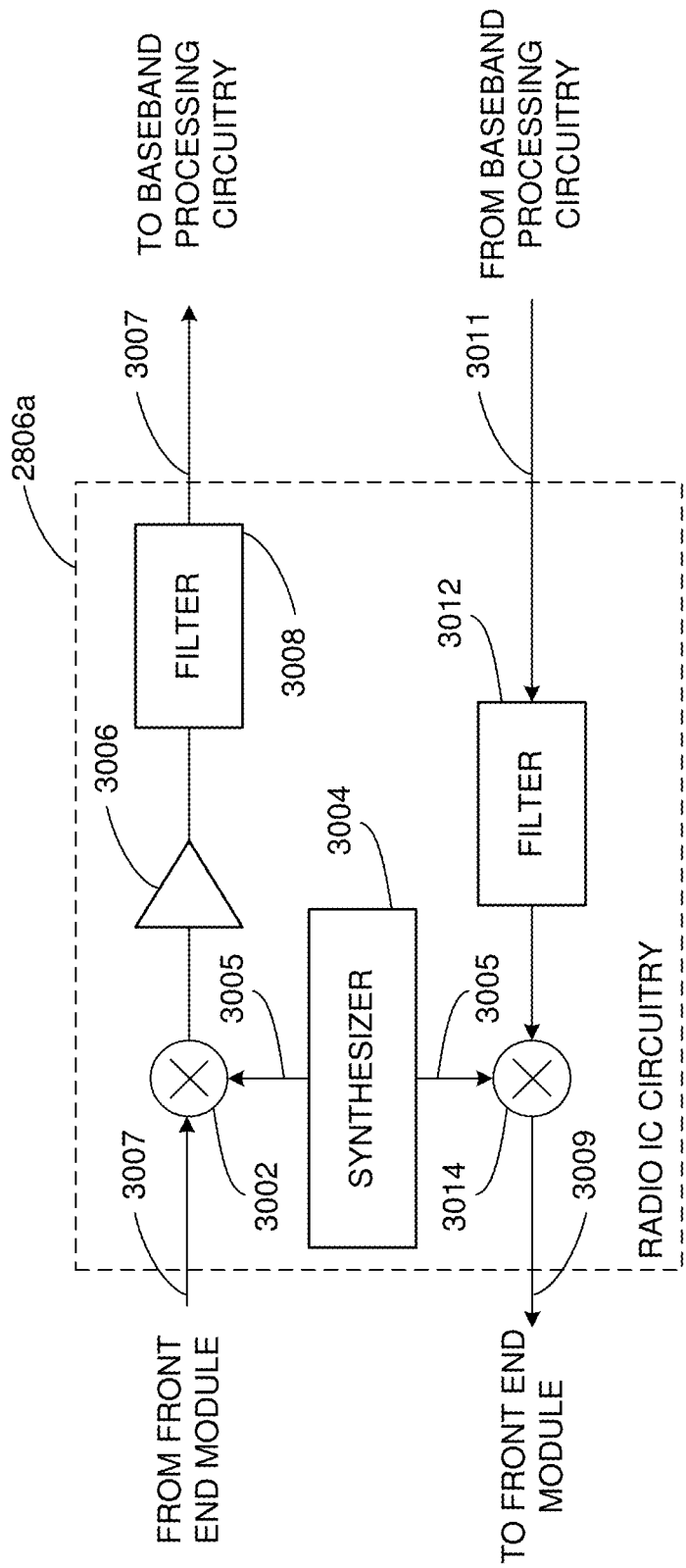
FIG. 30 illustrates an example radio IC circuitry for use in the radio architecture of FIG. 28, in accordance with one or more example embodiments of the present disclosure.

FIG. 30 illustrates radio IC circuitry 2806*a* in accordance with some embodiments. The radio IC circuitry 2806*a* is one example of circuitry that may be suitable for use as the WLAN or BT radio IC circuitry 2806*a*/2806*b* (FIG. 28), although other circuitry configurations may also be suitable. Alternatively, the example of FIG. 30 may be described in conjunction with the example BT radio IC circuitry 2806*b*.

In some embodiments, the radio IC circuitry 2806*a* may include a receive signal path and a transmit signal path. The receive signal path of the radio IC circuitry 2806*a* may include at least mixer circuitry 3002, such as, for example, down-conversion mixer circuitry, amplifier circuitry 3006 and filter circuitry 3008. The transmit signal path of the radio IC circuitry 2806*a* may include at least filter circuitry 3012 and mixer circuitry 3014, such as, for example, upconversion mixer circuitry. Radio IC circuitry 2806*a* may also include synthesizer circuitry 3004 for synthesizing a frequency 3005 for use by the mixer circuitry 3002 and the mixer circuitry 3014. The mixer circuitry 3002 and/or 3014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 30 illustrates only a simplified version of a radio IC circuitry, and may include, although not shown, embodiments where each of the depicted circuitries may include more than one component. For instance, mixer circuitry 3014 may each include one or more mixers, and filter circuitries 3008 and/or 3012 may each include one or more filters, such as one or more BPFs and/or LPFs according to application needs. For example, when mixer circuitries are of the direct-conversion type, they may each include two or more mixers.

In some embodiments, mixer circuitry 3002 may be configured to down-convert RF signals 2907 received from the FEM circuitry 2804a-b (FIG. 28) based on the synthesized frequency 3005 provided by synthesizer circuitry 3004. The amplifier circuitry 3006 may be configured to amplify the down-converted signals and the filter circuitry 3008 may include an LPF configured to remove unwanted signals from the down-converted signals to generate output baseband signals 3007. Output baseband signals 3007 may be provided to the baseband processing circuitry 2808a-b (FIG. 28) for further processing. In some embodiments, the output baseband signals 3007 may be zero-frequency baseband signals, although this is not a requirement. In some embodiments, mixer circuitry 3002 may comprise passive mixers, although the scope of the embodiments is not limited in this respect.

In some embodiments, the mixer circuitry 3014 may be configured to up-convert input baseband signals 3011 based on the synthesized frequency 3005 provided by the synthesizer circuitry 3004 to generate RF output signals 2909 for the FEM circuitry 2804a-b. The baseband signals 3011 may be provided by the baseband processing circuitry 2808a-b and may be filtered by filter circuitry 3012. The filter circuitry 3012 may include an LPF or a BPF, although the scope of the embodiments is not limited in this respect.

In some embodiments, the mixer circuitry 3002 and the mixer circuitry 3014 may each include two or more mixers and may be arranged for quadrature down-conversion and/or upconversion respectively with the help of synthesizer 3004. In some embodiments, the mixer circuitry 3002 and the mixer circuitry 3014 may each include two or more mixers each configured for image rejection (e.g., Hartley image rejection). In some embodiments, the mixer circuitry 3002 and the mixer circuitry 3014 may be arranged for direct down-conversion and/or direct upconversion, respectively. In some embodiments, the mixer circuitry 3002 and the mixer circuitry 3014 may be configured for super-heterodyne operation, although this is not a requirement.

Mixer circuitry 3002 may comprise, according to one embodiment: quadrature passive mixers (e.g., for the in-phase (I) and quadrature phase (Q) paths). In such an embodiment, RF input signal 2907 from FIG. 30 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 3005 of synthesizer 3004 (FIG. 30). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 2907 (FIG. 29) may comprise a balanced signal, although the scope of the embodiments is not limited in this respect. The I and Q baseband output signals may be provided to low-noise amplifier, such as amplifier circuitry 3006 (FIG. 30) or to filter circuitry 3008 (FIG. 30).

In some embodiments, the output baseband signals 3007 and the input baseband signals 3011 may be analog baseband signals, although the scope of the embodiments is not limited in this respect. In some alternate embodiments, the output baseband signals 3007 and the input baseband signals 3011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 3004 may be a fractional-N synthesizer or a fractional N/N+1 synthesizer, although the scope of the embodiments is not limited in this respect as other types of frequency synthesizers may be suitable. For example, synthesizer circuitry 3004 may be a delta-sigma synthesizer, a frequency multiplier, or a synthesizer comprising a phase-locked loop with a frequency divider. According to some embodiments, the synthesizer circuitry 3004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 3004 may be provided by a voltage controlled oscillator (VCO), although that is not a requirement. A divider control input may further be provided by either the baseband processing circuitry 2808a-b (FIG. 28) depending on the desired output frequency 3005. In some embodiments, a divider control input (e.g., N) may be determined from a look-up table (e.g., within a Wi-Fi card) based on a channel number and a channel center frequency as determined or indicated by the example application processor 2810. The application processor 2810 may include, or otherwise be connected to, one of the example secure signal converter 101 or the example received signal converter 103 (e.g., depending on which device the example radio architecture is implemented in).

In some embodiments, synthesizer circuitry 3004 may be configured to generate a carrier frequency as the output frequency 3005, while in other embodiments, the output frequency 3005 may be a fraction of the carrier frequency (e.g., one-half the carrier frequency, one-third the carrier frequency). In some embodiments, the output frequency 3005 may be a LO frequency (fLO).

Figure 31:
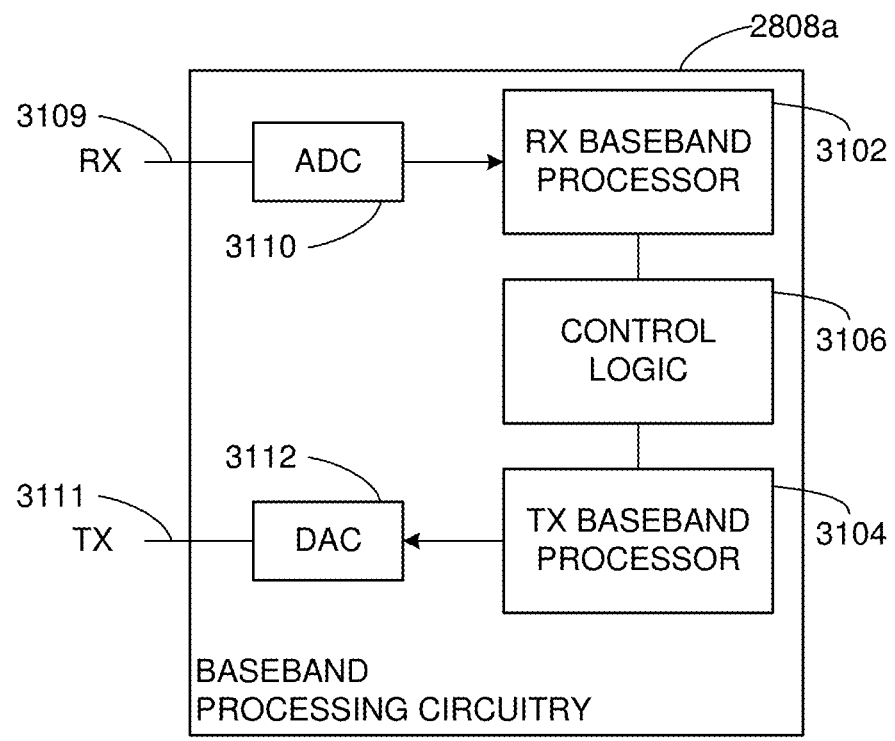
FIG. 31 illustrates an example baseband processing circuitry for use in the radio architecture of FIG. 28, in accordance with one or more example embodiments of the present disclosure.

FIG. 31 illustrates a functional block diagram of baseband processing circuitry 2808a in accordance with some embodiments. The baseband processing circuitry 2808a is one example of circuitry that may be suitable for use as the baseband processing circuitry 2808a (FIG. 28), although other circuitry configurations may also be suitable. Alternatively, the example of FIG. 30 may be used to implement the example BT baseband processing circuitry 2808*b* of FIG. 28.

The baseband processing circuitry 2808*a* may include a receive baseband processor (RX BBP) 3102 for processing receive baseband signals 3009 provided by the radio IC circuitry 2806*a-b* (FIG. 28) and a transmit baseband processor (TX BBP) 3104 for generating transmit baseband signals 3011 for the radio IC circuitry 2806*a-b*. The baseband processing circuitry 2808*a* may also include control logic 3106 for coordinating the operations of the baseband processing circuitry 2808*a*.

In some embodiments (e.g., when analog baseband signals are exchanged between the baseband processing circuitry 2808*a-b* and the radio IC circuitry 2806*a-b*), the baseband processing circuitry 2808*a* may include ADC 3110 to convert analog baseband signals 3109 received from the radio IC circuitry 2806*a-b* to digital baseband signals for processing by the RX BBP 3102. In these embodiments, the baseband processing circuitry 2808*a* may also include DAC 3112 to convert digital baseband signals from the TX BBP 3104 to analog baseband signals 3111.

In some embodiments that communicate OFDM signals or OFDMA signals, such as through baseband processor 2808*a*, the transmit baseband processor 3104 may be configured to generate OFDM or OFDMA signals as appropriate for transmission by performing an inverse fast Fourier transform (IFFT). The receive baseband processor 3102 may be configured to process received OFDM signals or OFDMA signals by performing an FFT. In some embodiments, the receive baseband processor 3102 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 28, in some embodiments, the antennas 2801 (FIG. 28) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 2801 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine a channel sounding sequence with one or more access points (APs), wherein the channel sounding sequence comprises a null data packet announcement (NDPA) communicated with at least one of the one or more APs; determine a first group of station devices (STAs) associated with a first basic service set (BSS); cause to send a trigger frame to the first group of STAs to solicit an uplink NDP from each STA of the first group of STAs; identify a first uplink NDP received from a first STA of the first group of STAs; and identify a second uplink NDP received from a second STA of a second group of STAs.

Example 2 may include the device of example 1 and/or some other example herein, wherein the channel sounding sequence may be sent to a first AP of the one or more APs followed by a null data packet (NDP) frame sent after a passage of a short inter-frame space (SIFS) time from the time the NDPA was sent.

Example 3 may include the device of example 1 and/or some other example herein, wherein the first STA belongs to the first BSS and the second STA belongs to a second BSS.

Example 4 may include the device of example 3 and/or some other example herein, wherein the processing circuitry may be further configured to identify a channel state information (CSI) report received from the first group of STAs.

Example 5 may include the device of example 1 and/or some other example herein, wherein the NDPA comprises information associated with the one or more APs, wherein the information indicates the one or more APs that will join in a multi-AP channel sounding sequence.

Example 6 may include the device of example 1 and/or some other example herein, wherein the NDPA comprises association identification (AID) information for the first group of STAs that are requested to process a downlink NDP frame.

Example 7 may include the device of example 1 and/or some other example herein, the first uplink NDP and the second uplink NDP are spatially multiplexed.

Example 8 may include the device of example 1 and/or some other example herein, wherein the first uplink NDP and the second uplink NDP are multiplexed in time.

Example 9 may include the device of example 1 and/or some other example herein, wherein the first uplink NDP in the second uplink NDP are multiplexed in frequency.

Example 10 may include the device of example 1 and/or some other example herein, further comprising a transceiver configured to transmit and receive wireless signals.

Example 11 may include the device of example 10 and/or some other example herein, further comprising an antenna coupled to the transceiver to cause to send the trigger frame.

Example 12 may include a non-transitory computer-readable medium storing computer-executable instructions which when executed by one or more processors result in performing operations comprising: determining a channel sounding sequence with one or more access points (APs), wherein the channel sounding sequence comprises a null data packet announcement (NDPA) communicated with at least one of the one or more APs; determining a first group of station devices (STAs) associated with a first basic service set (BSS); causing to send a trigger frame to the first group of STAs to solicit an uplink NDP from each STA of the first group of STAs; identifying a first uplink NDP received from a first STA of the first group of STAs; and identifying a second uplink NDP received from a second STA of a second group of STAs.

Example 13 may include the non-transitory computer-readable medium of example 12 and/or some other example herein, wherein the channel sounding sequence may be sent to a first AP of the one or more APs followed by a null data packet (NDP) frame sent after a passage of a short inter-frame space (SIFS) time from the time the NDPA was sent.

Example 14 may include the non-transitory computer-readable medium of example 12 and/or some other example herein, wherein the first STA belongs to the first BSS and the second STA belongs to a second BSS.

Example 15 may include the non-transitory computer-readable medium of example 14 and/or some other example herein, wherein the operations further comprise identifying a channel state information (CSI) report received from the first group of STAs.

Example 16 may include the non-transitory computer-readable medium of example 12 and/or some other example herein, wherein the NDPA comprises information associated with the one or more APs, wherein the information indicates the one or more APs that will join in a multi-AP channel sounding sequence.

Example 17 may include the non-transitory computer-readable medium of example 12 and/or some other example herein, wherein the NDPA comprises association identification (AID) information for the first group of STAs that are requested to process a downlink NDP frame.

Example 18 may include the non-transitory computer-readable medium of example 12 and/or some other example herein, the first uplink NDP and the second uplink NDP are spatially multiplexed.

Example 19 may include the non-transitory computer-readable medium of example 12 and/or some other example herein, wherein the first uplink NDP and the second uplink NDP are multiplexed in time.

Example 20 may include the non-transitory computer-readable medium of example 12 and/or some other example herein, wherein the first uplink NDP in the second uplink NDP are multiplexed in frequency.

Example 21 may include a method comprising: determining, by one or more processors, a channel sounding sequence with one or more access points (APs), wherein the channel sounding sequence comprises a null data packet announcement (NDPA) communicated with at least one of the one or more APs; determining a first group of station devices (STAs) associated with a first basic service set (BSS); causing to send a trigger frame to the first group of STAs to solicit an uplink NDP from each STA of the first group of STAs; identifying a first uplink NDP received from a first STA of the first group of STAs; and identifying a second uplink NDP received from a second STA of a second group of STAs.

Example 22 may include the method of example 21 and/or some other example herein, wherein the channel sounding sequence may be sent to a first AP of the one or more APs followed by a null data packet (NDP) frame sent after a passage of a short inter-frame space (SIFS) time from the time the NDPA was sent.

Example 23 may include the method of example 21 and/or some other example herein, wherein the first STA belongs to the first BSS and the second STA belongs to a second BSS.

Example 24 may include the method of example 23 and/or some other example herein, further comprising identifying a channel state information (CSI) report received from the first group of STAs.

Example 25 may include the method of example 21 and/or some other example herein, wherein the NDPA comprises information associated with the one or more APs, wherein the information indicates the one or more APs that will join in a multi-AP channel sounding sequence.

Example 26 may include the method of example 21 and/or some other example herein, wherein the NDPA comprises association identification (AID) information for the first group of STAs that are requested to process a downlink NDP frame.

Example 27 may include the method of example 21 and/or some other example herein, the first uplink NDP and the second uplink NDP are spatially multiplexed.

Example 28 may include the method of example 21 and/or some other example herein, wherein the first uplink NDP and the second uplink NDP are multiplexed in time.

Example 29 may include the method of example 21 and/or some other example herein, wherein the first uplink NDP in the second uplink NDP are multiplexed in frequency.

Example 30 may include an apparatus comprising means for: determining a channel sounding sequence with one or more access points (APs), wherein the channel sounding sequence comprises a null data packet announcement (NDPA) communicated with at least one of the one or more APs; determining a first group of station devices (STAs) associated with a first basic service set (BSS); causing to send a trigger frame to the first group of STAs to solicit an uplink NDP from each STA of the first group of STAs; identifying a first uplink NDP received from a first STA of the first group of STAs; and identifying a second uplink NDP received from a second STA of a second group of STAs.

Example 31 may include the apparatus of example 30 and/or some other example herein, wherein the channel sounding sequence may be sent to a first AP of the one or more APs followed by a null data packet (NDP) frame sent after a passage of a short inter-frame space (SIFS) time from the time the NDPA was sent.

Example 32 may include the apparatus of example 30 and/or some other example herein, wherein the first STA belongs to the first BSS and the second STA belongs to a second BSS.

Example 33 may include the apparatus of example 32 and/or some other example herein, further comprising identifying a channel state information (CSI) report received from the first group of STAs.

Example 34 may include the apparatus of example 30 and/or some other example herein, wherein the NDPA comprises information associated with the one or more APs, wherein the information indicates the one or more APs that will join in a multi-AP channel sounding sequence.

Example 35 may include the apparatus of example 30 and/or some other example herein, wherein the NDPA comprises association identification (AID) information for the first group of STAs that are requested to process a downlink NDP frame.

Example 36 may include the apparatus of example 30 and/or some other example herein, the first uplink NDP and the second uplink NDP are spatially multiplexed.

Example 37 may include the apparatus of example 30 and/or some other example herein, wherein the first uplink NDP and the second uplink NDP are multiplexed in time.

Example 38 may include the apparatus of example 30 and/or some other example herein, wherein the first uplink NDP in the second uplink NDP are multiplexed in frequency.

Example 39 may include one or more non-transitory computer-readable media comprising instructions to cause an electronic device, upon execution of the instructions by one or more processors of the electronic device, to perform one or more elements of a method described in or related to any of examples 1-38, or any other method or process described herein.

Example 40 may include an apparatus comprising logic, modules, and/or circuitry to perform one or more elements of a method described in or related to any of examples 1-38, or any other method or process described herein.

Example 41 may include a method, technique, or process as described in or related to any of examples 1-38, or portions or parts thereof.

Example 42 may include an apparatus comprising: one or more processors and one or more computer readable media comprising instructions that, when executed by the one or more processors, cause the one or more processors to perform the method, techniques, or process as described in or related to any of examples 1-38, or portions thereof.

Example 43 may include a method of communicating in a wireless network as shown and described herein.

Example 44 may include a system for providing wireless communication as shown and described herein.

Example 45 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
determine a channel sounding sequence with two or more access points (APs), wherein the channel sounding sequence comprises a null data packet announcement (NDPA) communicated with at least one of the two or more APs;
determine a first group of station devices (STAs) associated with a first basic service set (BSS);
cause to send a trigger frame to the first group of STAs to solicit an uplink NDP from each STA of the first group of STAs;
identify a first uplink NDP received from a first STA of the first group of STAs; and
identify a second uplink NDP received from a second STA of a second group of STAs.

2. The device of claim 1, wherein the channel sounding sequence is sent to a first AP of the two or more APs followed by a null data packet (NDP) frame sent after a passage of a short inter-frame space (SIFS) time from the time the NDPA was sent.

3. The device of claim 1, wherein the first STA belongs to the first BSS and the second STA belongs to a second BSS.

4. The device of claim 3, wherein the processing circuitry is further configured to identify a channel state information (CSI) report received from the first group of STAs.

5. The device of claim 1, wherein the NDPA comprises information associated with the two or more APs, wherein the information indicates the two or more APs that will join in a multi-AP channel sounding sequence.

6. The device of claim 1, wherein the NDPA comprises association identification (AID) information for the first group of STAs that are requested to process a downlink NDP frame.

7. The device of claim 1, the first uplink NDP and the second uplink NDP are spatially multiplexed.

8. The device of claim 1, wherein the first uplink NDP and the second uplink NDP are multiplexed in time.

9. The device of claim 1, wherein the first uplink NDP in the second uplink NDP are multiplexed in frequency.

10. The device of claim 1, further comprising a transceiver configured to transmit and receive wireless signals.

11. The device of claim 10, further comprising an antenna coupled to the transceiver to cause to send the trigger frame.

12. A non-transitory computer-readable medium storing computer-executable instructions which when executed by one or more processors result in performing operations comprising:
   determining a channel sounding sequence with two or more access points (APs), wherein the channel sounding sequence comprises a null data packet announcement (NDPA) communicated with at least one of the two or more APs;
   determining a first group of station devices (STAs) associated with a first basic service set (BSS);
   causing to send a trigger frame to the first group of STAs to solicit an uplink NDP from each STA of the first group of STAs;
   identifying a first uplink NDP received from a first STA of the first group of STAs; and
   identifying a second uplink NDP received from a second STA of a second group of STAs.

13. The non-transitory computer-readable medium of claim 12, wherein the channel sounding sequence is sent to a first AP of the two or more APs followed by a null data packet (NDP) frame sent after a passage of a short interframe space (SIFS) time from the time the NDPA was sent.

14. The non-transitory computer-readable medium of claim 12, wherein the first STA belongs to the first BSS and the second STA belongs to a second BSS.

15. The non-transitory computer-readable medium of claim 14, wherein the operations further comprise identifying a channel state information (CSI) report received from the first group of STAs.

16. The non-transitory computer-readable medium of claim 12, wherein the NDPA comprises information associated with the two or more APs, wherein the information indicates the two or more APs that will join in a multi-AP channel sounding sequence.

17. The non-transitory computer-readable medium of claim 12, wherein the NDPA comprises association identification (AID) information for the first group of STAs that are requested to process a downlink NDP frame.

18. The non-transitory computer-readable medium of claim 12, the first uplink NDP and the second uplink NDP are spatially multiplexed.

19. The non-transitory computer-readable medium of claim 12, wherein the first uplink NDP and the second uplink NDP are multiplexed in time.

20. A method comprising:
   determining, by two or more processors, a channel sounding sequence with two or more access points (APs), wherein the channel sounding sequence comprises a null data packet announcement (NDPA) communicated with at least one of the two or more APs;
   determining a first group of station devices (STAs) associated with a first basic service set (BSS);
   causing to send a trigger frame to the first group of STAs to solicit an uplink NDP from each STA of the first group of STAs;
   identifying a first uplink NDP received from a first STA of the first group of STAs; and
   identifying a second uplink NDP received from a second STA of a second group of STAs.

* * * * *